US 8,010,564 B2

(12) United States Patent
Minagawa et al.

(10) Patent No.: US 8,010,564 B2
(45) Date of Patent: Aug. 30, 2011

(54) LOGICAL STRUCTURE ANALYZING APPARATUS, METHOD, AND COMPUTER PRODUCT

(75) Inventors: Akihiro Minagawa, Kawasaki (JP); Yoshinobu Hotta, Kawasaki (JP); Yusaku Fujii, Kawasaki (JP); Katsuhito Fujimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 472 days.

(21) Appl. No.: 12/180,202

(22) Filed: Jul. 25, 2008

(65) Prior Publication Data

US 2009/0112797 A1    Apr. 30, 2009

(30) Foreign Application Priority Data

Oct. 31, 2007   (JP) ................................ 2007-283916

(51) Int. Cl.
*G06F 7/00* (2006.01)
*G06F 17/30* (2006.01)
(52) U.S. Cl. ........ 707/790; 707/791; 707/802; 707/803; 715/221; 715/224; 715/227; 382/176; 382/177
(58) Field of Classification Search ............... 707/705, 707/790, 791, 802, 803; 715/221, 224, 227, 715/243; 382/176, 177, 321
See application file for complete search history.

(56) References Cited

U.S. PATENT DOCUMENTS

| 5,566,068 | A | * | 10/1996 | Comer et al. | ......... | 707/999.001 |
| 6,035,061 | A | * | 3/2000 | Katsuyama et al. | .......... | 382/177 |
| 6,728,403 | B1 | * | 4/2004 | Jang et al. | ..................... | 382/180 |
| 6,757,870 | B1 | * | 6/2004 | Stinger | ......................... | 715/234 |
| 6,886,136 | B1 | * | 4/2005 | Zlotnick et al. | ............... | 715/780 |
| 7,792,369 | B2 | | 9/2010 | Minagawa et al. | | |
| 2003/0188260 | A1 | * | 10/2003 | Jensen et al. | ................... | 715/505 |
| 2004/0194035 | A1 | * | 9/2004 | Chakraborty | ................. | 715/531 |
| 2005/0268217 | A1 | * | 12/2005 | Garrison | ....................... | 715/505 |

(Continued)

FOREIGN PATENT DOCUMENTS

JP    2005275830 A   *  10/2005

(Continued)

OTHER PUBLICATIONS

Fan et al., "A feature point clustering approach to the segmentation of form documents", IEEE, 1995. vol. 2; p. 623-626. Download: http://ieeexplore.ieee.org/stamp/stamp.jsp?tp=&arnumber=601973.*

(Continued)

*Primary Examiner* — Jean B Fleurantin
*Assistant Examiner* — Hares Jami
(74) *Attorney, Agent, or Firm* — Fujitsu Patent Center

(57) ABSTRACT

A logical structure analyzing apparatus includes an extracting unit that extracts word candidates from a form, a first generating unit that classifies each of the word candidates into a group of heading candidates or a group of data candidates to generate, based on positions of the word candidates on the form, first candidates sets each including one heading candidate and one data candidate identifiable by the heading candidate, and a second generating unit that combines the first candidate sets to generate second candidate sets that each include plural heading candidates that differ and one data candidate. The apparatus also includes a removing unit that, based on positions of the heading candidates and the data word candidate in each second candidate set, removes from among the second candidates sets, a determined set including a data item and headings identifying the data item, and an output unit that outputs the determined set.

9 Claims, 40 Drawing Sheets

U.S. PATENT DOCUMENTS

| | | | | |
|---|---|---|---|---|
| 2006/0288269 | A1* | 12/2006 | Oppenlander et al. | 715/505 |
| 2008/0040513 | A1* | 2/2008 | Asakawa et al. | 710/1 |
| 2008/0212845 | A1* | 9/2008 | Lund | 382/112 |

FOREIGN PATENT DOCUMENTS

| | | |
|---|---|---|
| JP | A 2005-275830 | 10/2005 |
| JP | 2008-033830 A | 2/2008 |

OTHER PUBLICATIONS

Krishnamoorthy et al., "Syntactic segmentation and labeling of digitized pages from technical journals", IEEE, Jul. 1993, pp. 737-747. Downlaod: http://ieeexplore.ieee.org/stamp/stamp.jsp?tp=&arnumber=221173.*

* cited by examiner

| 品目 | 17年度 | 18年度 | 19年度 |
|---|---|---|---|
| 旅費 | 100,000 | 110,000 | 150,000 |
| 設備費 | 400,000 | 450,000 | 500,000 |
| 消耗品費 | 3,000 | 5,000 | 8,000 |

| C1 | C2 | C3 | C4 |
|---|---|---|---|
| C5 | C6 | C7 | C8 |
| C9 | C10 | C11 | C12 |
| C13 | C14 | C15 | C16 |

FIG.2

| CHARACTER NUMBER | CHARACTER CODE | COORDINATE ((UPPER LEFT)-(LOWER RIGHT)) | CELL NUMBER |
|---|---|---|---|
| 1 | "品" | (x1a,y1a)-(x1b,y1b) | C1 |
| 2 | "目" | (x2a,y2a)-(x2b,y2b) | |
| 3 | "1" | (x3a,y3a)-(x3b,y3b) | C2 |
| 4 | "7" | (x4a,y4a)-(x4b,y4b) | |
| 5 | "年" | (x5a,y5a)-(x5b,y5b) | |
| 6 | "度" | (x6a,y6a)-(x6b,y6b) | |
| 7 | "1" | (x7a,y7a)-(x7b,y7b) | C3 |
| 8 | "8" | (x8a,y8a)-(x8b,y8b) | |
| 9 | "年" | (x9a,y9a)-(x9b,y9b) | |
| 10 | "度" | (x10a,y10a)-(x10b,y10b) | |
| 11 | "1" | (x11a,y11a)-(x11b,y11b) | C4 |
| 12 | "9" | (x12a,y12a)-(x12b,y12b) | |
| 13 | "年" | (x13a,y13a)-(x13b,y13b) | |
| 14 | "度" | (x14a,y14a)-(x14b,y14b) | |
| 15 | "旅" | (x15a,y15a)-(x15b,y15b) | C5 |
| 16 | "費" | (x16a,y16a)-(x16b,y16b) | |
| 17 | "1" | (x17a,y17a)-(x17b,y17b) | C6 |
| ⋮ | ⋮ | ⋮ | ⋮ |
| 37 | "0" | (x37a,y37a)-(x37b,y37b) | C8 |
| 38 | "設" | (x38a,y38a)-(x38b,y38b) | C9 |
| 39 | "備" | (x39a,y39a)-(x39b,y39b) | |
| 40 | "費" | (x40a,y40a)-(x40b,y40b) | |
| 41 | "4" | (x41a,y41a)-(x41b,y41b) | C10 |
| ⋮ | ⋮ | ⋮ | ⋮ |
| 61 | "0" | (x61a,y61a)-(x61b,y61b) | C12 |
| 62 | "消" | (x62a,y62a)-(x62b,y62b) | C13 |
| 63 | "耗" | (x63a,y63a)-(x63b,y63b) | |
| 64 | "品" | (x64a,y64a)-(x64b,y64b) | |
| 65 | "費" | (x65a,y65a)-(x65b,y65b) | |
| 66 | "3" | (x66a,y66a)-(x66b,y66b) | C14 |
| ⋮ | ⋮ | ⋮ | ⋮ |
| 80 | "0" | (x80a,y80a)-(x80b,y80b) | C16 |

| LOGICAL ELEMENT GROUP G1: ITEM ||||
| --- | --- | --- | --- |
| LOGICAL ELEMENT ||||
| ELEMENT NUMBER | REPRESENTATIVE WORD | WORD ||
| E11 | TRAVEL EXPENSE | TRAVEL EXPENSE (旅費) ||
| | | BUSINESS TRIP EXPENSE ||
| | | BUSINESS TRAVEL EXPENSE ||
| E12 | TRAVEL EXPENSE | EQUIPMENT EXPENSE (設備費) ||
| | | FIXTURES EXPENSE ||
| | | EQUIPMENT FIXTURES EXPENSE ||
| E13 | MISCELLANEOUS EXPENSE | MISCELLANEOUS EXPENSE ||
| | | UNCLASSIFIED EXPENSE ||
| | | CONSUMABLES EXPENSE (消耗品費) ||

| LOGICAL ELEMENT GROUP G2: YEAR ||||
| --- | --- | --- | --- |
| LOGICAL ELEMENT ||||
| ELEMENT NUMBER | REPRESENTATIVE WORD | WORD ||
| E21 | 17TH YEAR | 17TH YEAR (17年度) ||
| | | YEAR 17 ||
| | | 2005TH YEAR ||
| | | YEAR 2005 ||
| E22 | 18TH YEAR | 18TH YEAR (18年度) ||
| | | YEAR 18 ||
| | | 2006TH YEAR ||
| | | YEAR 2006 ||
| E23 | 19TH YEAR | 19TH YEAR (19年度) ||
| | | YEAR 19 ||
| | | 2007TH YEAR ||
| | | YEAR 2007 ||

FIG.3C

LOGICAL ELEMENT GROUP G3: DATA — 303

| ELEMENT NUMBER | LOGICAL ELEMENTS | | RELATIONSHIP WITH OTHER GROUPS | |
|---|---|---|---|---|
| | REPRE-SENTATIVE WORD | WORD | CORRESPONDING HEADING LOGICAL ELEMENT COUNT | CORRESPONDING HEADING LOGICAL ELEMENT |
| E31 | TRAVEL EXPENSE 17TH YEAR | *(NUMERIC VALUE ONLY) *(NUMERIC VALUE,COMMA) *(NUMERIC VALUE,CURRENCY SIGN) *(NUMERIC VALUE,COMMA, CURRENCY SIGN) | 2 | E11 |
| ... | ... | ... | ... | ... |
| E39 | MISCEL-LANEOUS EXPENSE 19TH YEAR | *(NUMERIC VALUE ONLY) *(NUMERIC VALUE,COMMA) *(NUMERIC VALUE,CURRENCY SIGN) *(NUMERIC VALUE,COMMA, CURRENCY SIGN) | 2 | E13 |

Note: "CORRESPONDING HEADING LOGICAL ELEMENT" column also contains E21 (for E31 row) and E23 (for E39 row).

FIG.3D

| ELEMENT NUMBER | LOGICAL ELEMENT GROUP G3: DATA |||  CORRESPONDING LOGICAL ELEMENT GROUP ||
|---|---|---|---|---|---|
| | LOGICAL ELEMENTS ||| CORRESPONDING LOGICAL ELEMENT GROUP COUNT | CORRESPONDING LOGICAL ELEMENT GROUP |
| | REPRE-SENTATIVE WORD | WORD || | |
| E31 | TRAVEL EXPENSE 17TH YEAR | *(NUMERIC VALUE ONLY) | | 2 | E11 / E21 |
| | | *(NUMERIC VALUE,COMMA) | | | |
| | | *(NUMERIC VALUE,CURRENCY SIGN) | | | |
| | | *(NUMERIC VALUE,COMMA, CURRENCY SIGN) | | | |
| ... | ... | ... | | ... | ... / ... |
| E39 | MISCEL-LANEOUS EXPENSE 19TH YEAR | *(NUMERIC VALUE ONLY) | | 2 | E13 / E23 |
| | | *(NUMERIC VALUE,COMMA) | | | |
| | | *(NUMERIC VALUE,CURRENCY SIGN) | | | |
| | | *(NUMERIC VALUE,COMMA, CURRENCY SIGN) | | | |

| LOGICAL ELEMENT GROUP G1: ITEM | | | | |
|---|---|---|---|---|
| LOGICAL ELEMENT | | | | |
| ELEMENT NUMBER | REPRESENTATIVE WORD NAME | WORD CANDIDATE | CHARACTER COUNT | CHARACTER NUMBER |
| E11 | TRAVEL EXPENSE | We11-1(旅費) | 2 | 15,16 |
| E12 | EQUIPMENT EXPENSE | We12-1(設備費) | 3 | 38-40 |
| E13 | MISCELLANEOUS EXPENSE | We13-1(消耗品費) | 4 | 62-65 |

| LOGICAL ELEMENT GROUP G2: YEAR | | | | |
|---|---|---|---|---|
| LOGICAL ELEMENT | | | | |
| ELEMENT NUMBER | REPRESENTATIVE WORD NAME | WORD CANDIDATE | CHARACTER COUNT | CHARACTER NUMBER |
| E21 | 17TH YEAR | We21-1(17年度) | 4 | 3-6 |
| E22 | 18TH YEAR | We22-1(18年度) | 4 | 7-10 |
| E23 | 19TH YEAR | We23-1(19年度) | 4 | 11-14 |

| LOGICAL ELEMENT GROUP G3: DATA |||||
|---|---|---|---|---|
| LOGICAL ELEMENT |||||
| ELEMENT NUMBER | REPRESENTATIVE WORD NAME | WORD CANDIDATE | CHARACTER COUNT | CHARACTER NUMBER |
| E31 | TRAVEL EXPENSE 17TH YEAR | We31-1(100,000) | 7 | 17-23 |
| | | ⋮ | ⋮ | ⋮ |
| | | We31-9(8,000) | 5 | 76-80 |
| E32 | TRAVEL EXPENSE 18TH YEAR | We32-1(100,000) | 7 | 17-23 |
| | | ⋮ | ⋮ | ⋮ |
| | | We32-9(8,000) | 5 | 76-80 |
| E33 | TRAVEL EXPENSE 19TH YEAR | We33-1(100,000) | 7 | 17-23 |
| | | ⋮ | ⋮ | ⋮ |
| | | We33-9(8,000) | 5 | 76-80 |
| E34 | EQUIPMENT EXPENSE 17TH YEAR | We31-1(100,000) | 7 | 17-23 |
| | | ⋮ | ⋮ | ⋮ |
| | | We31-9(8,000) | 5 | 76-80 |
| E35 | EQUIPMENT EXPENSE 18TH YEAR | We32-1(100,000) | 7 | 17-23 |
| | | ⋮ | ⋮ | ⋮ |
| | | We32-9(8,000) | 5 | 76-80 |
| E36 | EQUIPMENT EXPENSE 19TH YEAR | We33-1(100,000) | 7 | 17-23 |
| | | ⋮ | ⋮ | ⋮ |
| | | We33-9(8,000) | 5 | 76-80 |
| E37 | MISCELLANEOUS EXPENSE 17TH YEAR | We31-1(100,000) | 7 | 17-23 |
| | | ⋮ | ⋮ | ⋮ |
| | | We31-9(8,000) | 5 | 76-80 |
| E38 | MISCELLANEOUS EXPENSE 18TH YEAR | We32-1(100,000) | 7 | 17-23 |
| | | ⋮ | ⋮ | ⋮ |
| | | We32-9(8,000) | 5 | 76-80 |
| E39 | MISCELLANEOUS EXPENSE 19TH YEAR | We33-1(100,000) | 7 | 17-23 |
| | | ⋮ | ⋮ | ⋮ |
| | | We33-9(8,000) | 5 | 76-80 |

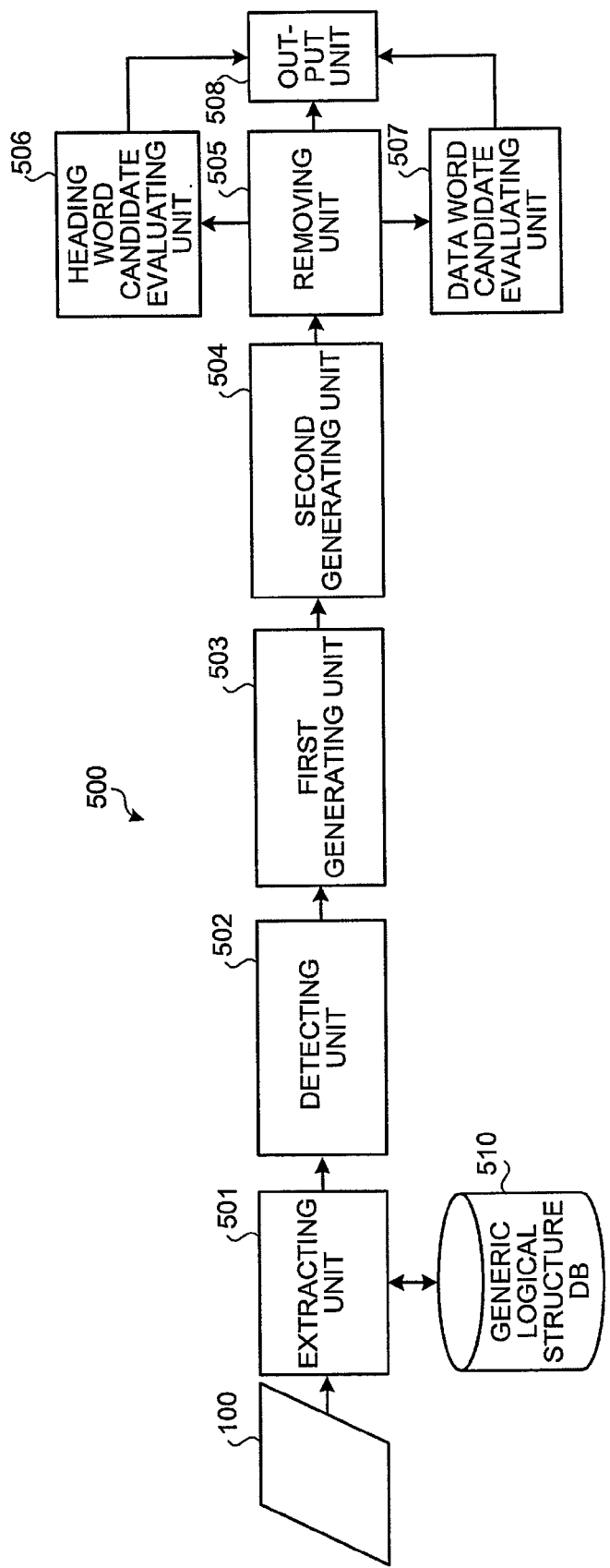

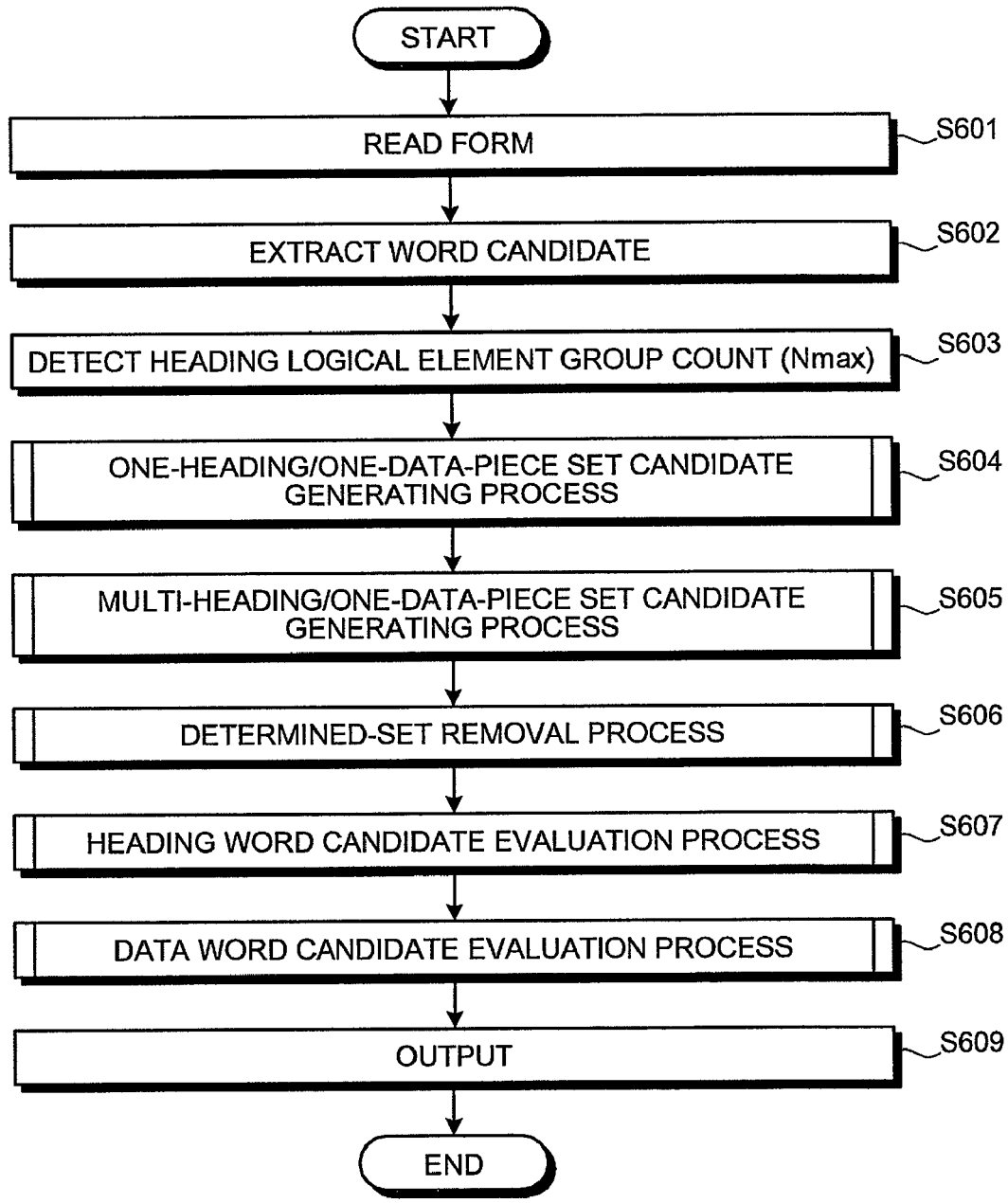

FIG.7A

| ITEM | 17TH YEAR | 18TH YEAR | 19TH YEAR |
|---|---|---|---|
| TRAVEL EXPENSE | 100,000 | 110,000 | 150,000 |
| EQUIPMENT EXPENSE | 400,000 | 450,000 | 500,000 |
| CONSUMABLES EXPENSE | 3,000 | 5,000 | 8,000 |

FIG.7B

| ITEM | 17TH YEAR | 18TH YEAR | 19TH YEAR |
|---|---|---|---|
| TRAVEL EXPENSE | 100,000 | 110,000 | 150,000 |
| EQUIPMENT EXPENSE | 400,000 | 450,000 | 500,000 |
| CONSUMABLES EXPENSE | 3,000 | 5,000 | 8,000 |

FIG.7C

| ITEM | 17TH YEAR | 18TH YEAR | 19TH YEAR |
|---|---|---|---|
| TRAVEL EXPENSE | 100,000 | 110,000 | 150,000 |
| EQUIPMENT EXPENSE | 400,000 | 450,000 | 500,000 |
| CONSUMABLES EXPENSE | 3,000 | 5,000 | 8,000 |

FIG.7D

| ITEM | 17TH YEAR | 18TH YEAR | 19TH YEAR |
|---|---|---|---|
| TRAVEL EXPENSE | 100,000 | 110,000 | 150,000 |
| EQUIPMENT EXPENSE | 400,000 | 450,000 | 500,000 |
| CONSUMABLES EXPENSE | 3,000 | 5,000 | 8,000 |

FIG.9A

| ITEM | 17TH YEAR | 18TH YEAR | 19TH YEAR |
|---|---|---|---|
| TRAVEL EXPENSE | 100,000 | 110,000 | (150,000) |
| EQUIPMENT EXPENSE | 400,000 | 450,000 | (500,000) |
| (CONSUMABLES EXPENSE) | (3,000) | (5,000) | 8,000 |

FIG.9B

| ITEM | 17TH YEAR | 18TH YEAR | (19TH YEAR) |
|---|---|---|---|
| TRAVEL EXPENSE | 100,000 | 110,000 | (150,000) |
| EQUIPMENT EXPENSE | 400,000 | 450,000 | (500,000) |
| CONSUMABLES EXPENSE | 3,000 | 5,000 | (8,000) |

FIG.9C

| ITEM | 17TH YEAR | 18TH YEAR | (19TH YEAR) |
|---|---|---|---|
| TRAVEL EXPENSE | 100,000 | 110,000 | 150,000 |
| EQUIPMENT EXPENSE | 400,000 | 450,000 | 500,000 |
| (CONSUMABLES EXPENSE) | 3,000 | 5,000 | (8,000) |

FIG.9D

| ITEM | (17TH YEAR) | 18TH YEAR | (19TH YEAR) |
|---|---|---|---|
| TRAVEL EXPENSE | (100,000) | (110,000) | (150,000) |
| EQUIPMENT EXPENSE | (400,000) | (450,000) | (500,000) |
| CONSUMABLES EXPENSE | (3,000) | (5,000) | (8,000) |

FIG.13A

| ITEM | 17TH YEAR | 18TH YEAR | 19TH YEAR |
|---|---|---|---|
| TRAVEL EXPENSE | 100,000 | 110,000 | 150,000 |
| EQUIPMENT EXPENSE | 400,000 | 450,000 | 500,000 |
| CONSUMABLES EXPENSE | 3,000 | 5,000 | 8,000 |

FIG.13B

ONLY CANDIDATE FOR TRAVEL EXPENSE OF 17TH YEAR → DETERMINE/REMOVE

| ITEM | 17TH YEAR | 18TH YEAR | 19TH YEAR |
|---|---|---|---|
| TRAVEL EXPENSE | 100,000 | 110,000 | 150,000 |
| EQUIPMENT EXPENSE | 400,000 | 450,000 | 500,000 |
| CONSUMABLES EXPENSE | 3,000 | 5,000 | 8,000 |

FIG.13C

ONLY CANDIDATE FOR EQUIPMENT EXPENSE OF 17TH YEAR → DETERMINE/REMOVE

ONLY CANDIDATE FOR TRAVEL EXPENSE OF 18TH YEAR → DETERMINE/REMOVE

| ITEM | 17TH YEAR | 18TH YEAR | 19TH YEAR |
|---|---|---|---|
| TRAVEL EXPENSE | 100,000 | 110,000 | 150,000 |
| EQUIPMENT EXPENSE | 400,000 | 450,000 | 500,000 |
| CONSUMABLES EXPENSE | 3,000 | 5,000 | 8,000 |

FIG.13D

FIRST ROUND    SECOND ROUND

| ITEM | 17TH YEAR | 18TH YEAR | 19TH YEAR | |
|---|---|---|---|---|
| TRAVEL EXPENSE | 100,000 | 110,000 | 150,000 | THIRD ROUND |
| EQUIPMENT EXPENSE | 400,000 | 450,000 | 500,000 | FOURTH ROUND |
| CONSUMABLES EXPENSE | 3,000 | 5,000 | 8,000 | FIFTH ROUND |

FIG.14A

| ITEM | 17TH YEAR | 18TH YEAR | 19TH YEAR |
|---|---|---|---|
| TRAVEL EXPENSE | 100,000 | 110,000 | 150,000 |
| EQUIPMENT EXPENSE | 400,000 | 450,000 | 500,000 |
| CONSUMABLES EXPENSE | 3,000 | 5,000 | 8,000 |

FIG.14B

| ITEM | 17TH YEAR | 18TH YEAR | 19TH YEAR |
|---|---|---|---|
| TRAVEL EXPENSE | 100,000 | 110,000 | 150,000 |
| EQUIPMENT EXPENSE | 400,000 | 450,000 | 500,000 |
| CONSUMABLES EXPENSE | 3,000 | 5,000 | 8,000 |

FIG.14C

| ITEM | 17TH YEAR | 18TH YEAR | 19TH YEAR |
|---|---|---|---|
| TRAVEL EXPENSE | 100,000 | 110,000 | 150,000 |
| EQUIPMENT EXPENSE | 400,000 | 450,000 | 500,000 |
| CONSUMABLES EXPENSE | 3,000 | 5,000 | 8,000 |

FIRST ROUND, SECOND ROUND, THIRD ROUND, FOURTH ROUND, FIFTH ROUND

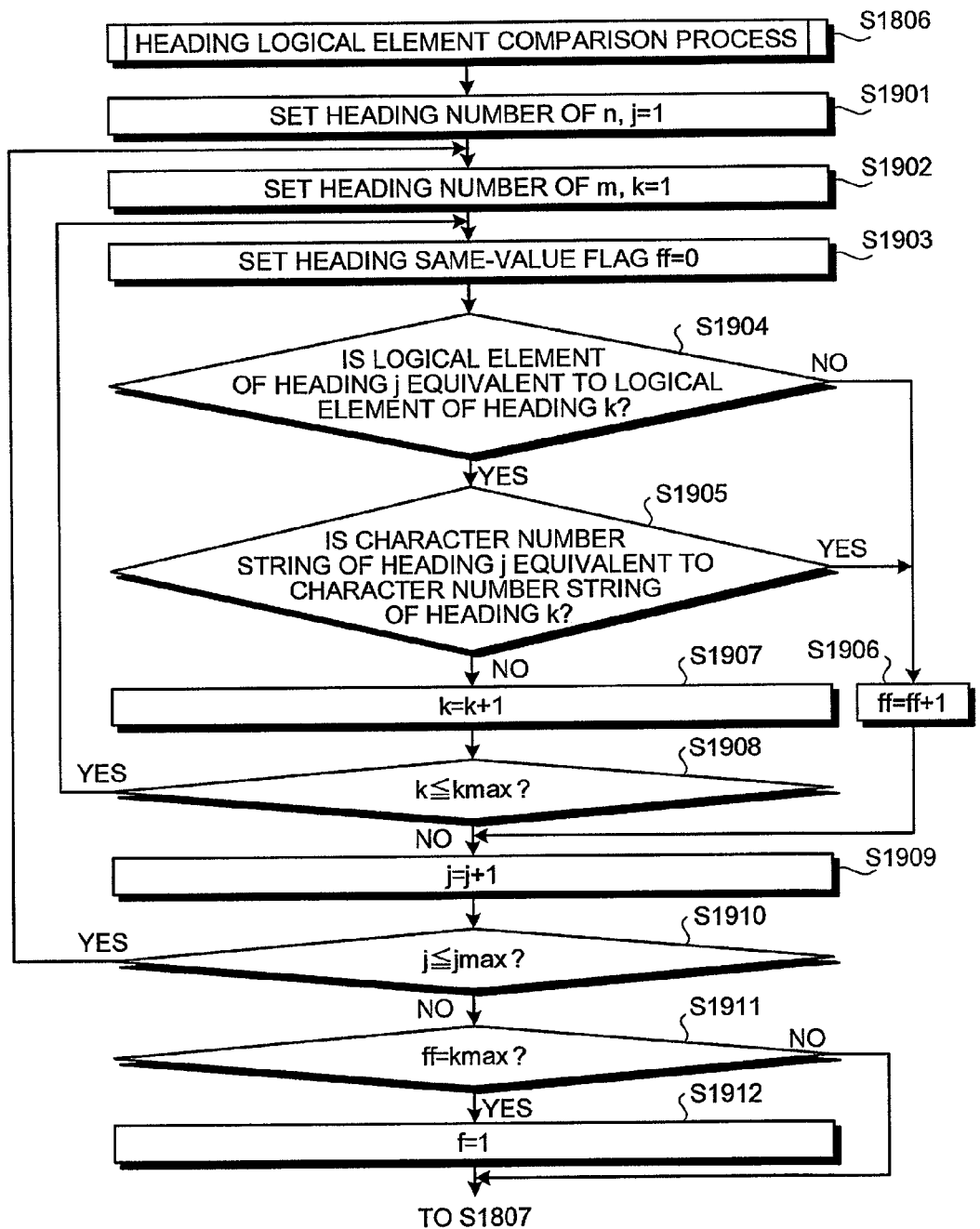

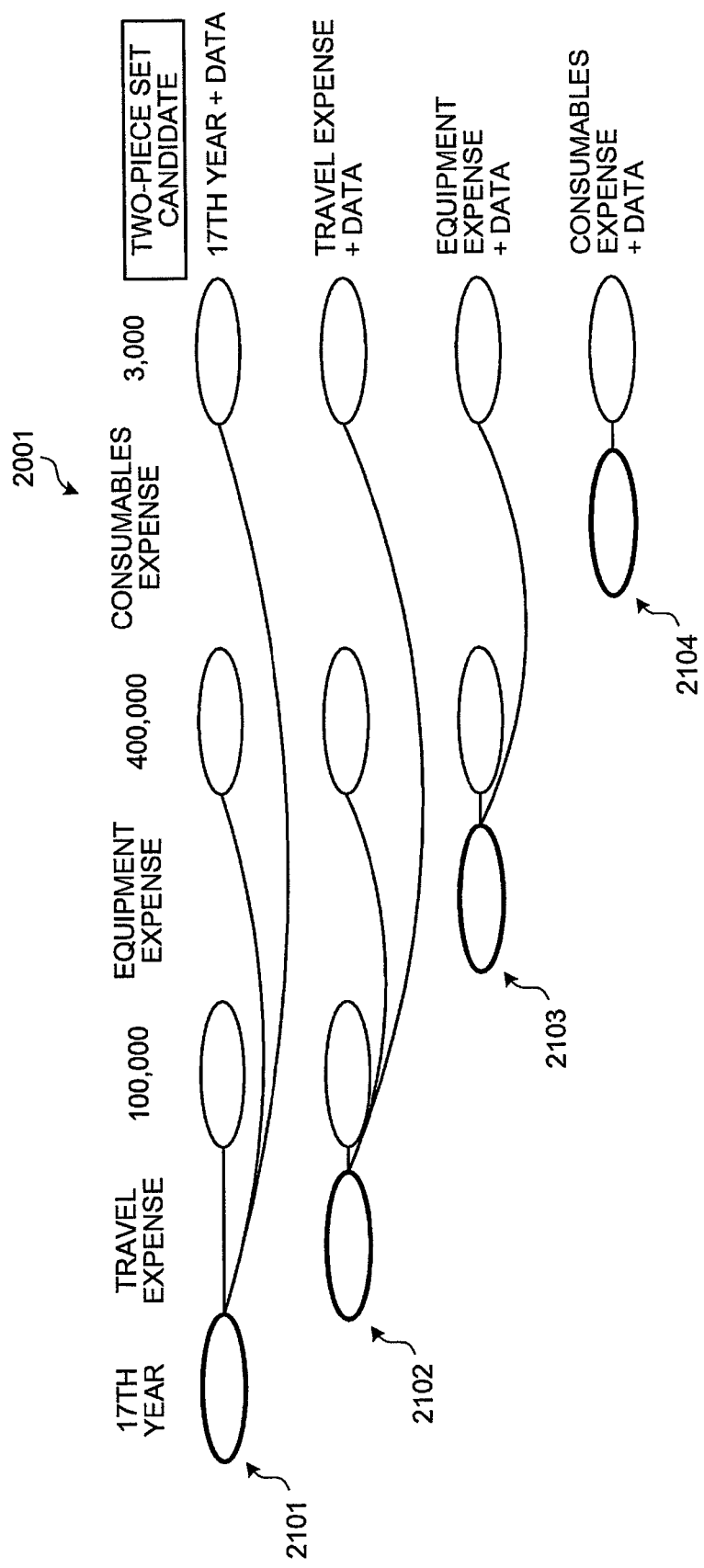

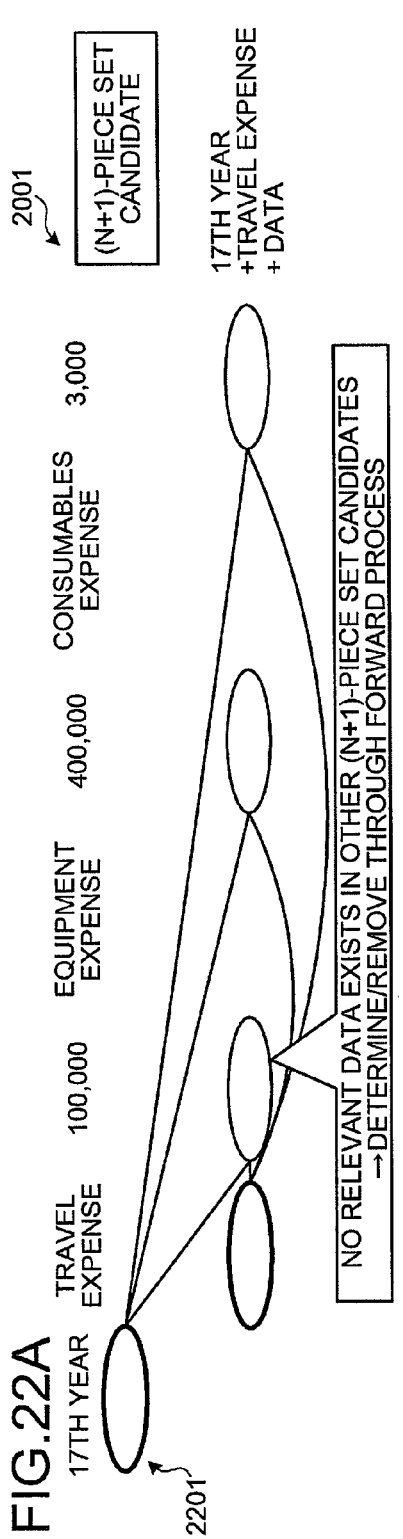
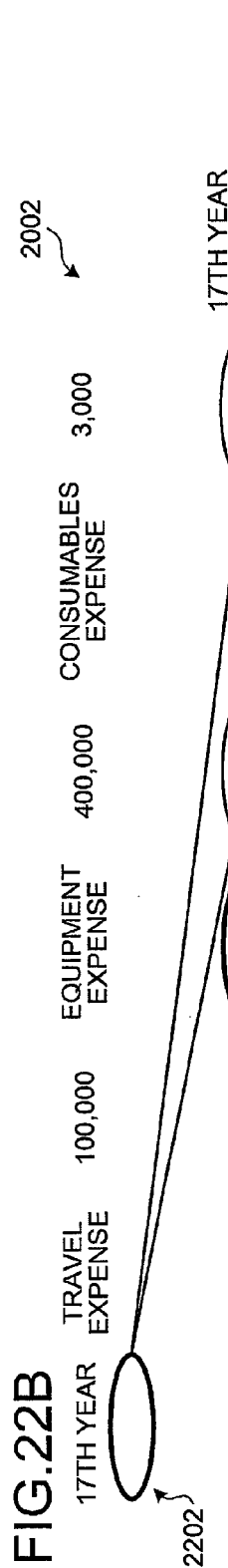
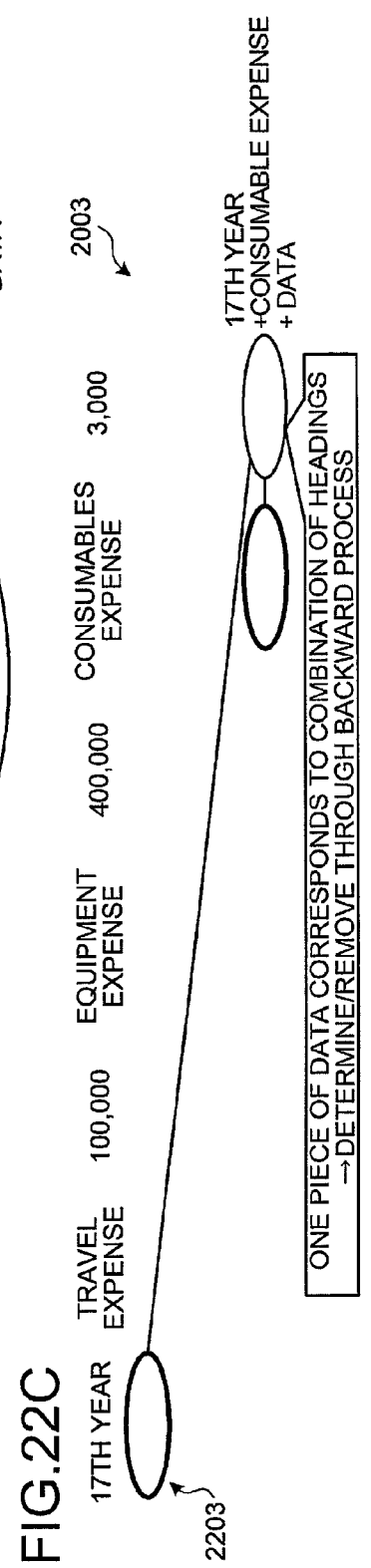

COMBINATION 1

COMBINATION 2

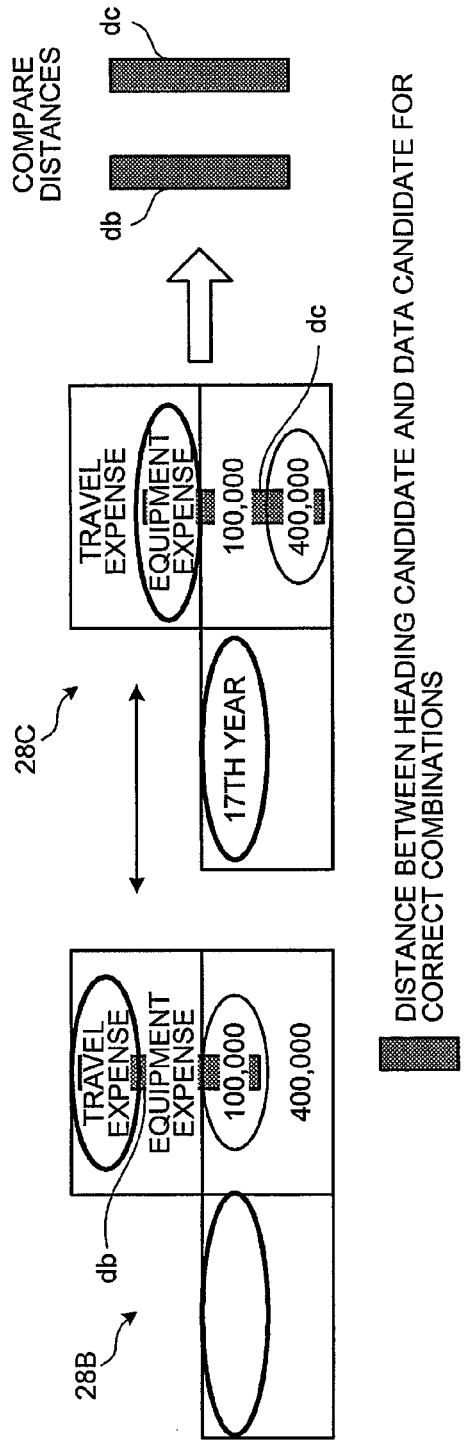
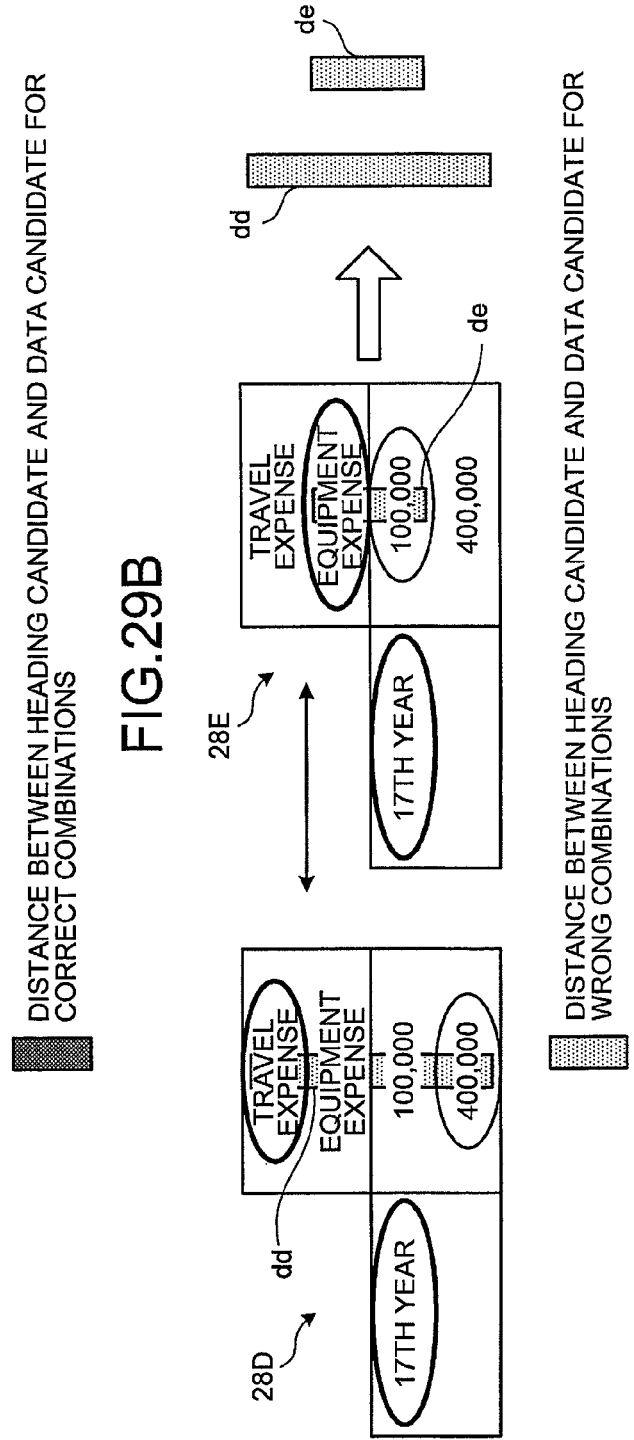

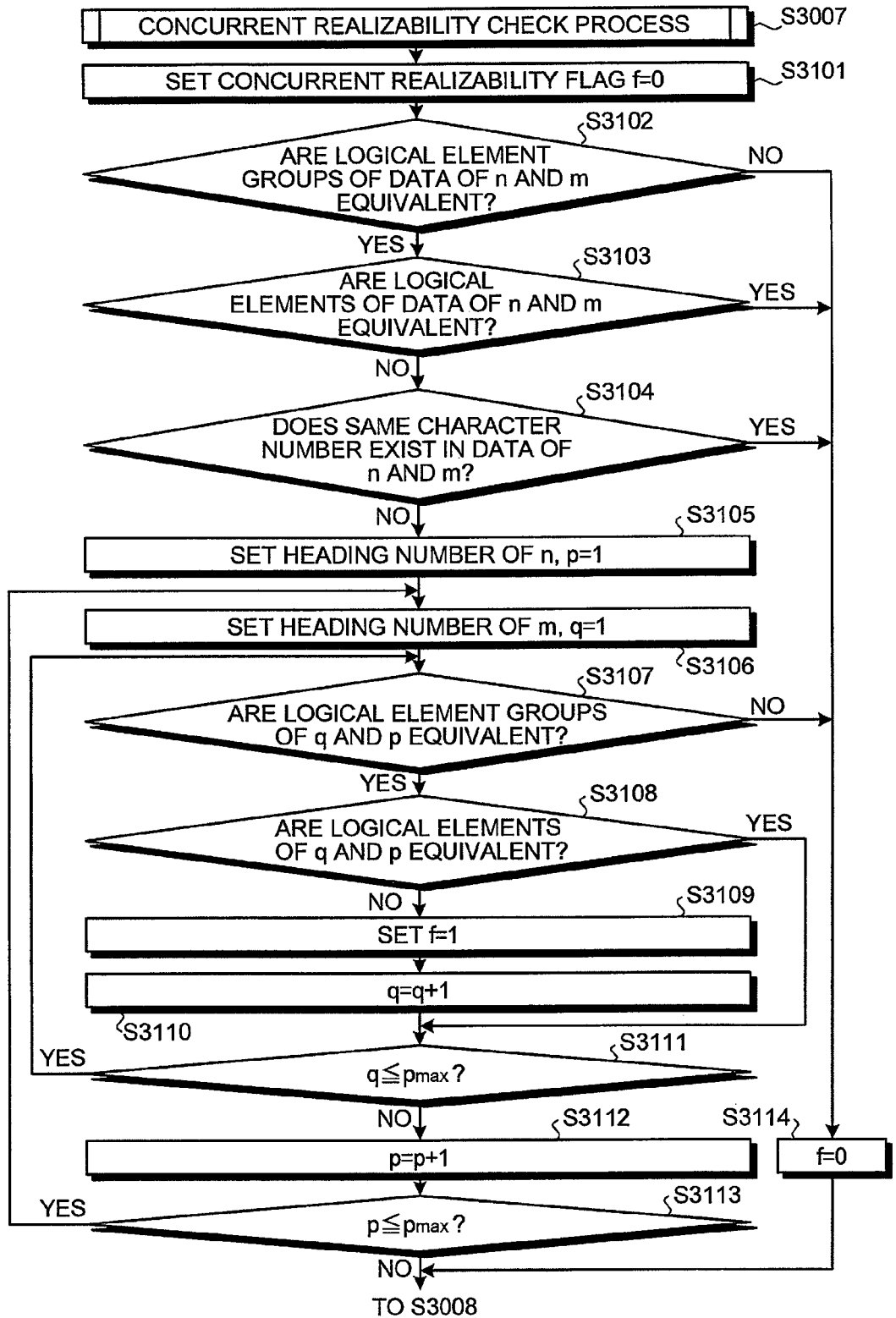

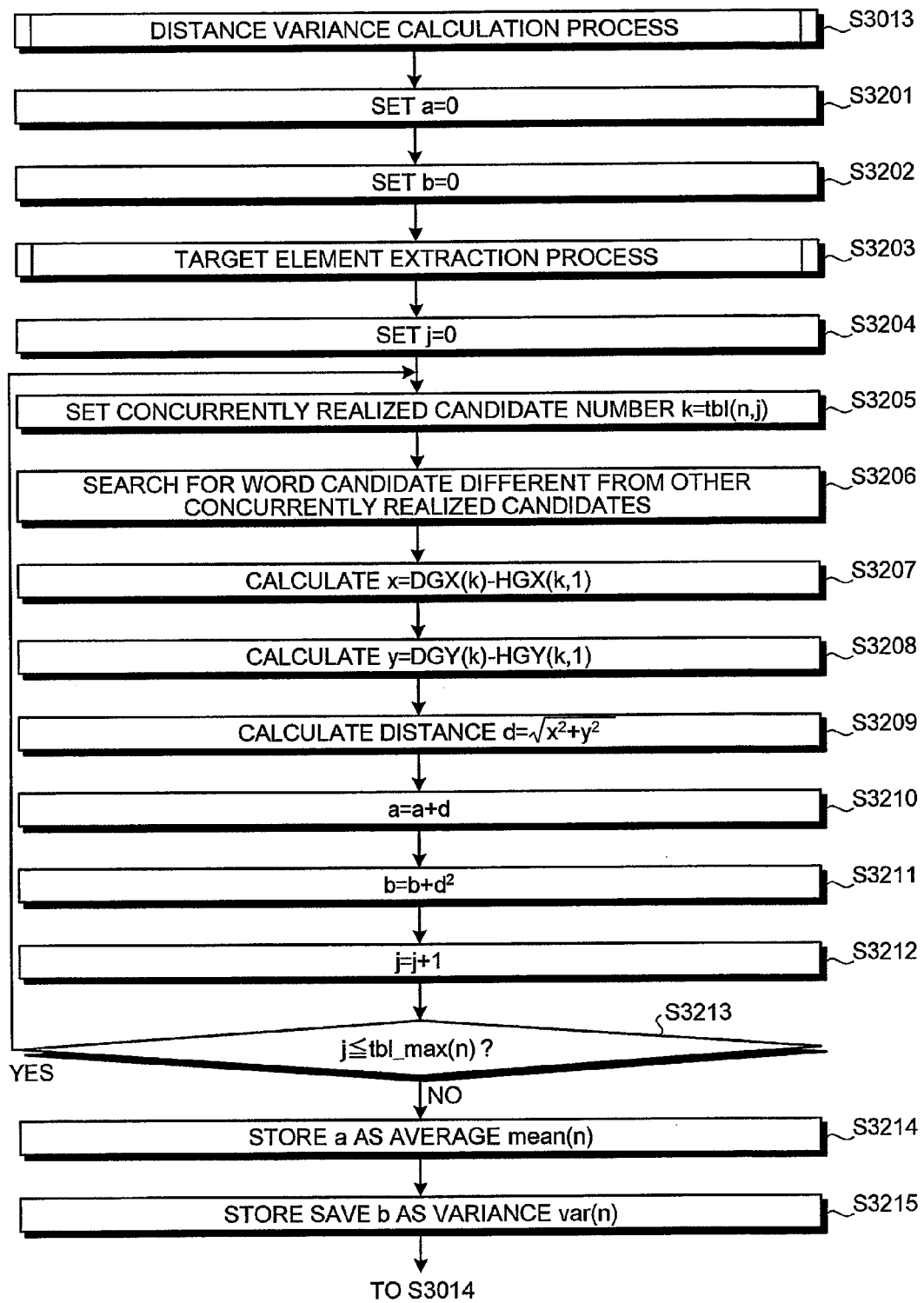

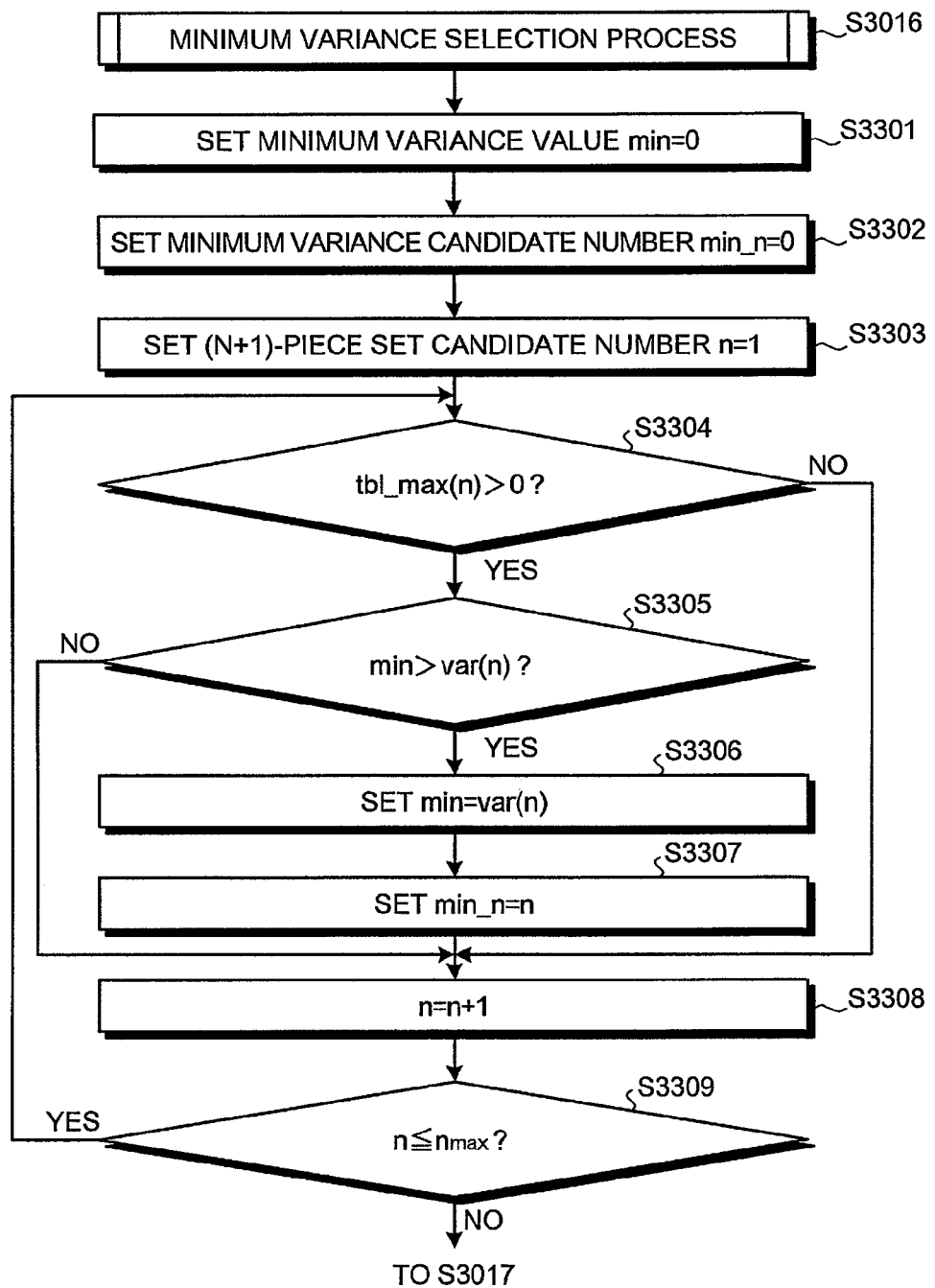

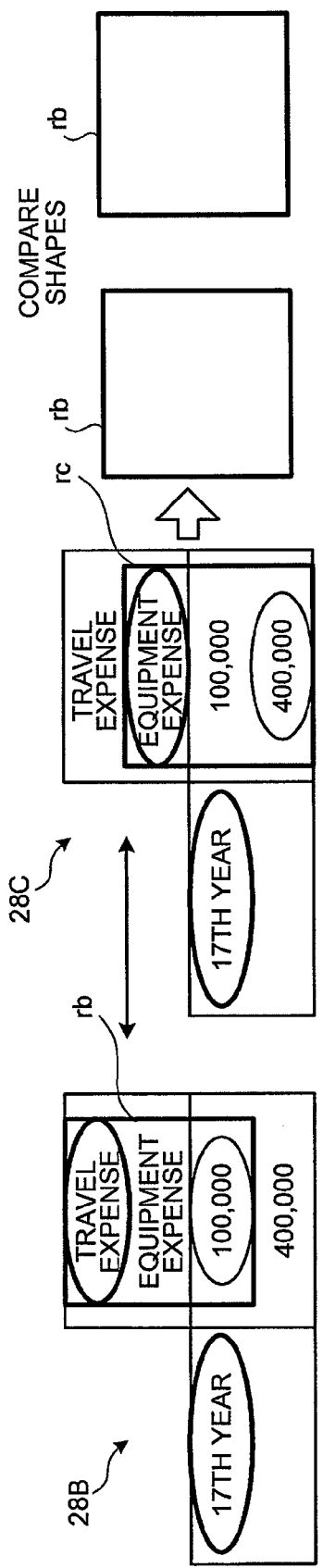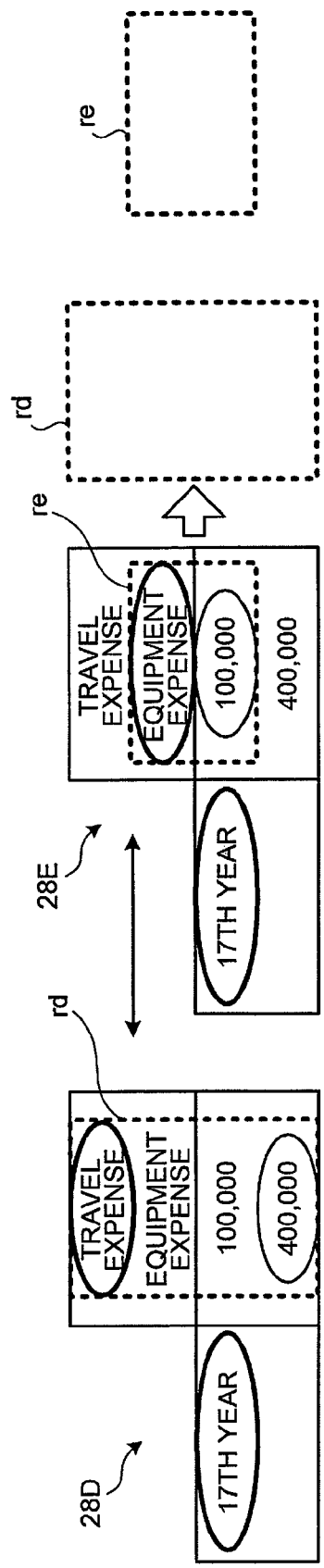

LOGICAL STRUCTURE ANALYZING APPARATUS, METHOD, AND COMPUTER PRODUCT

CROSS-REFERENCE TO RELATED APPLICATIONS

This application is based upon and claims the benefit of priority from the prior Japanese Patent Application No. 2007-283916, filed on Oct. 31, 2007, the entire contents of which are incorporated herein by reference.

BACKGROUND OF THE INVENTION

1. Field of the Invention

The present invention relates to logical structure (relationship) analysis among character strings on forms, including paper and electronic.

2. Description of the Related Art

Conventionally, to extract data from paper forms, structured forms, forms having fixed layouts, have been used. In the extraction of data from structured forms, characters or character strings having certain meaning exist in certain areas and field definitions for the layout are generated defining such characters, character strings and positions. Data are extracted by analyzing these characters and/or character strings written in the relevant areas. However, the cost of creating field definitions for the layout becomes huge if created for a form that is processed for only a few copies; hence, data are manually input for such a form, which instead requires a huge data entry cost.

Recently, data positions can be identified even if the order of headings is changed in a table, and a data extracting method is disclosed in Japanese Patent Application Laid-Open Publication No. 2005-275830 for a case in which headings in the same column are reversed when a table is created.

However, conventionally, logical structure analysis for unstructured layouts is either a mode of extracting data when a relationship between headings is hierarchical such as a relationship between a main heading and a subheading or based on equivalent relationships among the subheadings making up the hierarchy, or a logical structure analyzing mode applicable to a form having certain ruled lines and cells defining non-unique orders within heading groups.

Therefore, it is problematic that the conventional process is not applicable to (1) a form from which data is obtained by plural headings, however, it cannot be determined whether the data forms a table, (2) a form with the same heading in plural, each of which corresponds to a piece of data respectively, or (3) a form having a structure in which headings and corresponding data are not adjacent, such as (heading 1)—(heading 2)—(data corresponding to heading 1)—(data corresponding to heading 2).

For example, problems (1) and (3) above are not addressed by the technique disclosed in Japanese Patent Application Laid-Open Publication No. 2005-275830, since cell relationship is used on the premise that a table is used. Further, if problem (2) is not addressed, relationships remain ambiguous when plural data items correspond to the same heading character string, resulting in decreased accuracy in logical structure analysis.

SUMMARY OF THE INVENTION

It is an object of the present invention to at least solve the above problems in the conventional technologies.

A computer-readable recording medium according to one aspect of the present invention stores therein a logical structure analyzing computer program causing a computer to execute extracting unit word candidates from character strings on a form including one or more headings and one or more data items; classifying each of the word candidates into a group of heading candidates for the headings or a group of data candidates for the data items to generate, based on positions of the word candidates on the form, first candidate sets each including one of the heading candidates and one of the data candidates identifiable by the heading candidate included; combining the first candidate sets to generate second candidate sets such that each includes a plurality of the heading candidates that differ and one of the data candidates; removing, from among the second candidate sets and for each of the data items, a determined set including a data item among the data items and the headings identifying the data item, the removing being based on positions, on the form, of the heading candidates and the data word candidate included in each of the second candidate sets; and outputting the determined set.

A logical structure analyzing apparatus according to another aspect of the present invention includes an extracting unit that extracts word candidates from character strings on a form including one or more headings and one or more data items; a first generating unit that classifies each of the word candidates into a group of heading candidates for the headings or a group of data candidates for the data items to generate, based on positions of the word candidates on the form, first candidate sets each including one of the heading candidates and one of the data candidates identifiable by the heading candidate included; a second generating unit that combines the first candidate sets to generate second candidate sets such that each includes a plurality of the heading candidates that differ and one of the data candidates; a removing unit that, for each of the data items and based on positions, on the form, of the heading candidates and the data word candidate included in each of the second candidate sets, removes from among the second candidate sets, a determined set including a data item among the data items and the headings identifying the data item; and an output unit that outputs the determined set.

A logical structure analyzing method according to still another aspect of the present invention includes extracting unit word candidates from character strings on a form including one or more headings and one or more data items; classifying each of the word candidates into a group of heading candidates for the headings or a group of data candidates for the data items to generate, based on positions of the word candidates on the form, first candidate sets each including one of the heading candidates and one of the data candidates identifiable by the heading candidate included; combining the first candidate sets to generate second candidate sets such that each includes a plurality of the heading candidates that differ and one of the data candidates; removing, from among the second candidate sets and for each of the data items, a determined set including a data item among the data items and the headings identifying the data item, the removing being based on positions, on the form, of the heading candidates and the data word candidate included in each of the second candidate sets; and outputting the determined set.

The other objects, features, and advantages of the present invention are specifically set forth in or will become apparent from the following detailed description of the invention when read in conjunction with the accompanying drawings.

BRIEF DESCRIPTION OF THE DRAWINGS

FIGS. 1A and 1B are schematics concerning an example of a form subject to logical structure analysis;

FIG. 2 is a schematic of the character information of the form;

FIGS. 3A to 3D are schematics of storage contents of a common logical structure DB;

FIGS. 4A to 4C are schematics of word candidate extraction results from the form;

FIG. 5 is a block diagram of a functional configuration of a logical structure analyzing apparatus;

FIG. 6 is a flowchart of a logical structure analyzing process;

FIGS. 7A to 7D are schematics detailing generation of two-piece set candidates;

FIGS. 9A to 9D are schematics detailing generation of (N+1)-piece set candidates;

FIGS. 13A to 14C are schematics detailing removal of determined sets of (N+1)-piece set candidates;

FIG. 19 is a flowchart detailing a heading logical element comparison process (step S1806) shown in FIG. 18;

FIG. 21 is a schematic of two-piece set candidates obtained from the form shown in FIG. 20A;

FIGS. 22A to 22C are schematics of (N+1)-piece set candidates obtained from the form shown in FIG. 20A;

FIGS. 29A and 29B are schematics of evaluation examples of combinations of three-piece set candidates;

FIG. 31 is a flowchart detailing a concurrent realizability check process (step S3007);

FIG. 32A is a flowchart detailing a distance variance calculation process (step S3013);

FIG. 33 is a flowchart detailing a minimum variance selection process (step S3016);

FIGS. 34A and 34B are schematics of another evaluation example of combinations of the three-piece set candidates;

DETAILED DESCRIPTION OF THE PREFERRED EMBODIMENTS

Figure 8:
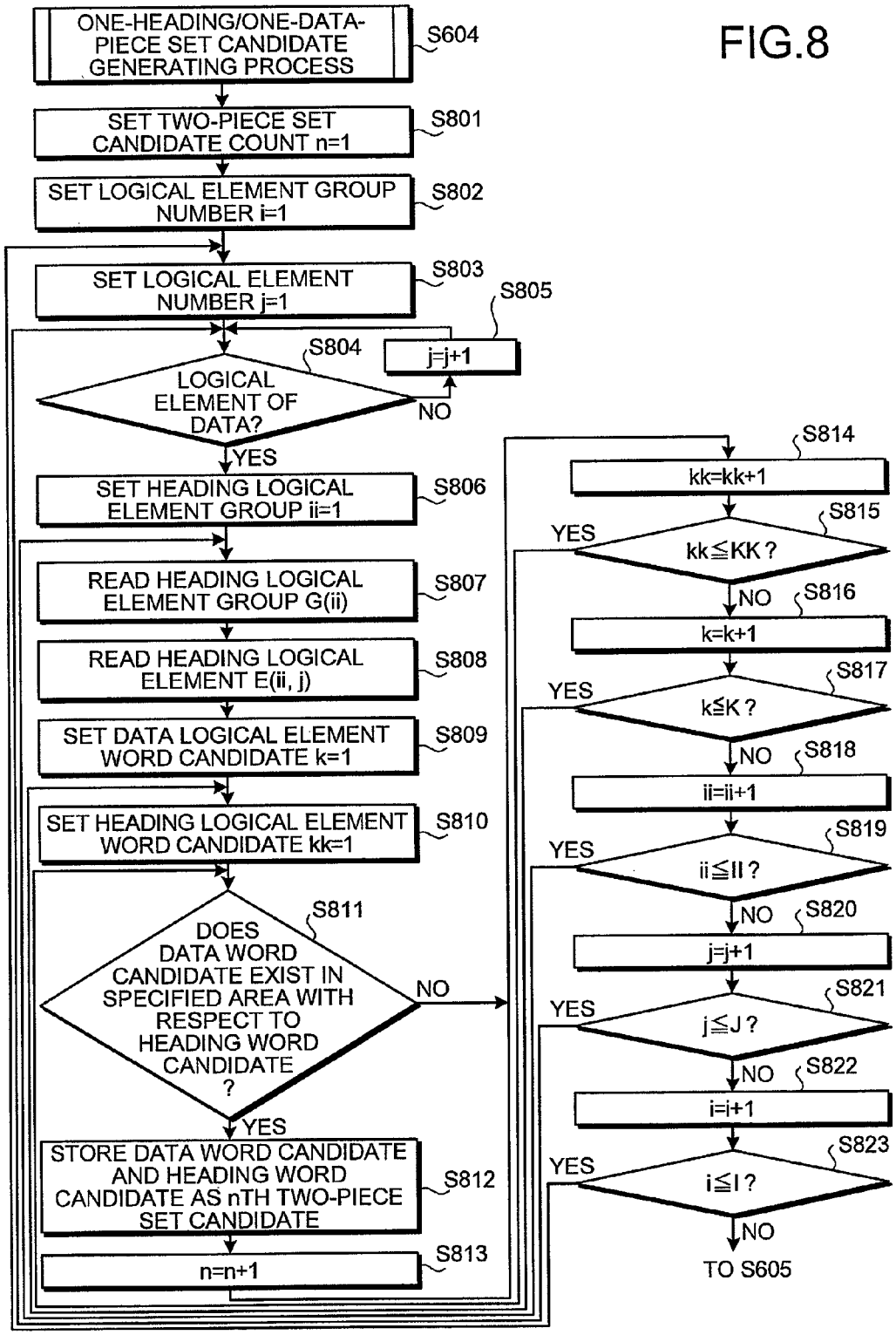
FIG. 8 is a flowchart detailing a one-heading/one-data-piece set candidate generating process (step S604)

Referring to the accompanying drawings, exemplary embodiments according to the present invention are explained in detail below. The logical structure analysis according to the embodiment is a technology of reading a form of a paper medium or image data, analyzing character information and layout information (if a layout such as a table exists) on the form, and analyzing a logical structure of the character information. The logical structure as used herein is a logical structure indicating correlation between a heading in the form and data identified by the heading. In this description, if a term "data" is simply used, this indicates an arbitrary numeric value (such as a monetary amount and a numerical quantity), i.e., a wild card.

FIGS. 1A and 1B are schematics concerning an example of a form subject to logical structure analysis. As shown in FIG. 1A, a form 100 has a matrix-like logical structure in which character strings are written in cells. The character strings, as headings, include items (旅費), such as travel expense (旅費), equipment expense (設備費) and consumables expense (消耗品費), and the year, such as 17th year (17 7 年度), 18th year (18 7 年度), and 19th year (19 7 年度),. These are collectively referred to as character information. A value written in an intersecting area of a given item and a given year is identified as a value of the item for that year. For example, the data of travel expense for the 17th year is 100,000 (yen).

FIG. 1B is layout information of the form 100 shown in FIG. 1A. The layout information is information such as frames and lines excluding the character information. The cells are assigned identifiers (cell numbers) C1 to C16, respectively. Therefore, if a logical structure is analyzed by this embodiment, the form 100 can be converted to a spreadsheet including the character information thereof by creating a spreadsheet based on this layout information and writing the relevant character information into each of the cells of the spreadsheet, respectively.

FIG. 2 is a schematic of the character information of the form 100. The form 100 is read and character information is obtained, which includes character numbers, character codes, coordinates, and cell numbers. The character numbers are unique numbers assigned in ascending order beginning from "1" to each of the character codes, respectively.

The character codes are characters read from the form 100. Even if the same character code is read more than once, a different character number is assigned each time. The coordinates identify positions of the character code on the form 100. A position of the character code is identified by upper left coordinates and lower right coordinates of a rectangle surrounding the character code from an arbitrary position on the form defined as a starting point. The cells in which the character codes are written are identified by the cell numbers.

FIGS. 3A to 3D are schematics of storage contents of a common logical structure DB. FIGS. 3A and 3B are tables of logical elements related to the heading items (hereinafter, "heading logical elements"), and FIGS. 3C and 3D are tables of logical elements related to data (hereinafter, "data logical elements").

FIG. 3A depicts a logical element table of a logical element group G1: Item. The heading logical element table 301 includes element numbers, representative words, and words. The element numbers are unique numbers assigned to the representative words. A logical element with an element number Eij will be referred to hereinafter as a logical element Eij. The representative words are typical words indicative of the items. The words are character strings indicative of words equivalent to or synonyms of the representative words.

Taking an element number E11 as an example, the representative word is an expression, "travel expense", and the words thereof are expressions including "travel expense", "business trip expense", and "business travel expense". Since equivalent words and synonyms are provided in this way, similar headings can be identified in wide variety of forms.

FIG. 3B depicts a logical element table of a logical element group G2: Year. This heading logical element table 302 also includes element numbers, representative words, and words as is the case with the heading logical element table 301. Taking an element number E21 as an example, the representative word is an expression, "17th year", and the words thereof are expressions including "17th year", "year 17", "2005th year", and "year 2005".

FIG. 3C depicts a logical element table of a logical element group G3: Data. This data logical element table 303 stores relationships with other groups G1 and G2 in addition to the element numbers, the representative words, and the words shown in FIGS. 3A and 3B. Since the data are values identified by both of the headings (item and year), the representative words are character strings linking the representative words of the logical element group G1: Item and the representative words of the logical element group G2: Year. Taking an element number E31 as an example, the representative word is an expression "travel expense 17th year" linking "travel expense" and "17th year".

Since arbitrary numeric values are written on the form 100, the words are represented by * (wild cards). However, even in the case of the wild cards, equivalent words and synonyms related to the wild cards are stored, such as a numeric value alone; a numeric value and a comma(s); a numeric value and a currency sign (such as ¥, yen, $, dollar, etc.); and a numeric value, a comma(s), and a currency sign.

For the relationships with the other groups G1 and G2, the corresponding heading logical element counts and the element numbers of the corresponding heading logical elements are stored. The corresponding heading logical elements are logical elements related to the heading items identifying the data, and the corresponding heading logical element count is the number thereof. Taking the element number E31 as an example, it can be known that the data related to the representative word "17th year" are identified by two corresponding heading logical elements E11 (the representative word "travel expense") and E21 (the representative word "17th year"). Since the logical element count of the item is three (E11 to E13) and the logical element count of the year is also three (E21 to E23), the logical element count of the data is three times three, i.e. nine (E31 to E39).

FIG. 3D depicts another example of the logical element table 303 related to the data shown in FIG. 3C. In a logical element table 304 shown in FIG. 3D, the logical elements (the element numbers, the representative words, and the words) are the same as the logical element table 303. On the other hand, in the logical element table 304, the relationships with other groups are represented on the basis of the corresponding logical element groups rather than on the basis of the corresponding heading logical elements as in logical element table 303.

In the case of FIG. 3D, the logical element table 303 shown in FIG. 3C is generated with reference to the logical element tables of FIGS. 3A and 3B. Taking the element number E31 as an example, since the corresponding logical element groups are G1 and G2 and the representative word is "travel expense 17th year" linking "travel expense" and "17th year", the element number E11 having the representative word "travel expense" can be identified from the logical element table 301 of the corresponding logical element group G1, and the element number E21 having the representative word "17th year" can be identified from the logical element table 302 of the corresponding logical element group G2.

FIGS. 4A to 4C are schematics of word candidate extraction results from the form 100 shown in FIG. 1A. FIG. 4A is a word candidate extraction result 401 related to the logical element group G1: Item. FIG. 4B is a word candidate extraction result 402 related to the logical element group G2: Year. FIG. 4C is a word candidate extraction result 403 related to the logical element group G3: Data.

As shown in FIGS. 4A to 4C, for each of the element numbers and the representative words thereof, the word candidate extraction results 401 to 403 include word candidates, character counts, and the character numbers. The word candidates are the words included the logical element tables 301 to 304 having character codes that match the character codes shown in FIG. 2. The character counts indicate the number of characters in the word candidates, respectively, and the character numbers are the character numbers corresponding to the character codes forming the word candidates. In FIGS. 4A to 4C, a word candidate of the logical element Eij will be described as Weij-k. In this case, k denotes a number of a word candidate.

From among the words identified by the element number, a matching word is selected as a word candidate. Taking the word extraction result related to the logical element group G1: Item shown in FIG. 4A as an example, among the words of the element number E11, "travel expense" 〔旅費〕 is matched with "travel expense" 〔旅費〕 among the items shown in FIG. 1A. Since the "travel expense" 〔旅費〕 among the items shown in FIG. 1A is written in the cell C5 in the layout information, the cell C5 is used as a clue to acquire the character count (=2) and the character numbers (15 and 16) from the character information shown in FIG. 2. A word candidate for the heading logical element is referred to as a heading word candidate, and a word candidate for the data logical element is referred to as a data word candidate.

FIG. 5 is a block diagram of a functional configuration of a logical structure analyzing apparatus 500. As shown in FIG. 5, the logical structure analyzing apparatus 500 includes an extracting unit 501, a detecting unit 502, a first generating unit 503, a second generating unit 504, a removing unit 505, a heading word candidate evaluating unit 506, a data word candidate evaluating unit 507, and an output unit 508.

Functions of the units 501 to 508 can be implemented by a CPU executing programs related thereto and stored in a storage unit (HD or memory) of the logical structure analyzing apparatus 500. The functions may be implemented through an input/output I/F.

Data output from the units 501 to 508 are stored in the storage unit. It is assumed that functions of connection destinations indicated by arrows of FIG. 5 are implemented by reading, from the storage unit, the data output from the connection-source units and by the execution of relevant programs by the CPU. The common logical structure DB is included in the logical structure analyzing apparatus 500 or an external server capable of communicating with the logical structure analyzing apparatus 500 and stores therein the logical element tables 301 to 303 shown in FIGS. 3A to 3C (or FIG. 3D).

The extracting unit 501 extracts a relevant word as a word candidate from the character information written on the form 100. Specifically, the word candidate extraction results shown in FIGS. 4A to 4C are output by referencing the readout result shown in FIG. 2 and a generic logical structure DB 510 (the logical element tables 301 to 304).

The detecting unit 502 detects a heading-logical-element-group count, which is the number of types of the heading items making up the form 100. Specifically, for example, since the logical element group G1: Item and the logical element group G2: Year are used as the heading logical elements for extracting the word candidates on the form 100 shown in FIG. 1A, the heading logical element group count Nmax=2 is detected.

The first generating unit 503 generates a candidate that is a combination of one heading item selected from the form 100 and one piece of data identified by the heading item (a one-heading/one-data-piece set, hereinafter, simply "two-piece set"). The second generating unit 504 has a function of generating a candidate that is a combination of N heading items (where N is 2≦N≦Nmax) selected from the form 100 and one piece of data identified by the heading items (a multi-heading/one-data-piece set, hereinafter, simply "(N+1)-piece set").

The removing unit 505 determines and outputs the heading word candidates, among the (N+1)-piece set candidates, as the headings corresponding to the data if only one piece of data is determined to correspond to an identical combination of the heading word candidates. The removing unit 505 also determines and outputs the heading word candidates if only one (N+1)-piece set candidate exists that has one data word candidate of a data logical element. The removing unit 505 also recursively executes a process of removing these candidates and checking whether a determinable (N+1)-piece set candidate exists.

With regard to a function of the heading word candidate evaluating unit 506, if the removing unit 505 cannot identify only one (N+1)-piece set since plural data word candidates exist for a data logical element, a heading logical element giving heading word candidates at different positions is selected from among only the (N+1)-piece set candidates having a data logical element with the same data word candidate and, a combination of (N+1) pieces is evaluated based on the positional relationship between the heading word candidates and the data word candidates.

With regard to a function of the data word candidate evaluating unit 507, if the removing unit 505 cannot identify only one (N+1)-piece set when plural data word candidates exist for a data logical element, a combination of (N+1) pieces is evaluated for the (N+1)-piece set candidates having combinations made up of the same heading word candidates and different data word candidates, and combinations of heading word candidates of different logical elements all having the same data word candidate, based on the positional relationships thereof.

The output unit 508 output a result of the logical structure analysis. The output format may be display on a display, print output through a printer, transmission to an external computer, and storage into an internal storage unit. In the case of a server/client configuration, the logical structure analyzing apparatus 500 is a server and therefore transmits the logical structure analysis result to a client, and the logical structure analysis result is displayed on a display of the receiving client.

FIG. 6 is a flowchart of a logical structure analysis process procedure. As shown in FIG. 6, the form 100 is read (step S601) and deconstructed to the character information (see S601) and the layout information 101, and the extracting unit 501 acquires the word candidate extraction result as shown in FIGS. 4A to 4C (step S602). The detecting unit 502 then detects the heading logical element count Nmax of the form 100 (step S603).

The first generating unit 503 executes the one-heading/one-data-piece set candidate generating process (step S604); the second generating unit 504 executes the multi-heading/one-data-piece set candidate generating process (process S605); the removing unit 505 executes the determined set removal process (step S606); the heading word candidate evaluating unit 506 executes the heading word candidate evaluation process (step S607); and the data word candidate evaluating unit 507 executes the data word candidate evaluation process (step S608). The heading word candidate evaluation process (step S607) and the data word candidate evaluation process (step S608) are executed as needed.

Finally, the output unit 508 outputs a process result of the steps S606 to S608 (step S609). Details are hereinafter described for the first generating unit 503, the second generating unit 504, the removing unit 505, the heading word candidate evaluating unit 506, and the data word candidate evaluating unit 507.

FIGS. 7A to 7D are schematics detailing generation of two-piece set candidates. A two-piece set candidate is a combination of a given heading item and data that can be identified by the heading item. The heading items of the form 100 are correlated with data located on the lower side, on the right side, and on the lower right side. In this description, a position of the lower side, the right side, or the lower right side of a heading item is referred to as a specified area. Therefore, the specified areas differ for each heading item. A heading item and data located in the specified area thereof make up two-piece set candidates.

In FIGS. 7A to 7D, heavy-lined ovals indicate selected heading items, and thin-lined ovals indicate data that can be identified by the selected heading item. Line segments linking the heavy-line ovals and the thin-line ovals indicate combinations formed. A combination of a heavy-line oval and a thin-line oval is a two-piece set candidate.

FIG. 7A shows the two-piece set candidates when the heading word candidate "travel expense" of the element number E11 of the logical element group G1: Item is selected. Nine two-piece set candidates are acquired due to the positional relationships of the "travel expense" and the data word candidates of the logical element group G3. Although the word candidates "17th year" to "19th year" are included in the differing group G2, these candidates are heading items and are not eligible for the two-piece set candidates.

FIG. 7B depicts the two-piece set candidates when the heading word candidate "consumable expense" of the element number E13 of the logical element group G1: Item is selected. Three two-piece set candidates are acquired due to the positional relationships of the "consumable expense" and the data word candidates of the logical element group G3. Other data are located on the upper right side with respect to the position of the "miscellaneous expense" and are not eligible to form the two-piece set candidates.

FIG. 7C depicts the two-piece set candidates when the heading word candidate "17th year" of the element number E21 of the logical element group G2: Year is selected. Nine two-piece set candidates are acquired due to the positional relationships of the "17th year" and the data word candidates of the logical element group G3.

FIG. 7D depicts the two-piece set candidates when the heading word candidate "19th year" of the element number E23 of the logical element group G2: Year is selected. Three two-piece set candidates are acquired due to the positional relationships of the "19th year" and the data word candidates of the logical element group G3.

FIG. 8 is a flowchart detailing the one-heading/one-data-piece set candidate generating process (step S604). First, a two-piece set candidate count n is set to n=1 (step S801); the number i of the logical element group Gi is set to i=1 (step S802); and the number j of the logical element Eij is set to j=1 (step S803).

It is then determined whether the logical element Eij is a logical element of the data (step S804). If the element is not a logical element of the data (step S804: NO), j is incremented (step S805) and the procedure returns to step S804. On the other hand, if the element is a logical element of the data (step S805: YES), the number ii of the logical element group Gi (represented by G(ii) in distinction from Gi) is set to ii=1 (step S806), and the heading logical element group G(ii) is read (step S807). For example, in the case of ii=1, the heading logical element group G1 (the logical element group G1 shown in FIG. 4A) is read among the word candidate extraction results shown in FIGS. 4A to 4C.

The heading logical element Eij (represented by E(ii, j) in distinction from Eij) is then read (step S808). For example, the logical element group Gi shown in FIG. 4A is read as the heading logical element group G(ii), and as ii=1 and j=1, E(ii,j) is defined and the heading logical element E11 is read from the logical element group G1 as E(ii,j).

The word candidate number k of the data logical element Eij identified at step S804 is then set to k=1 (step S809), and the word candidate number k (represented by kk in distinction from k of step S809) of the heading logical element E(i,j) read at step S808 is then set to kk=1 (step S810).

It is determined whether a data word candidate Weij-k exists in the specified area with respect to a heading word candidate We(ii,j-kk) (step S811). Whether the candidate exists in the specified area can be identified by the cell numbers and the coordinates shown in FIG. 2.

If the candidate exists in the specified area (step S811: YES), a combination of the heading word candidate We(ii,j-kk) and the data word candidate Weij-k is stored as an nth two-piece set (step S812). After incrementing n (step S811), the procedure goes to step S814. On the other hand, if the candidate does not exist in the specified area (step S811: NO), the procedure goes to step S814.

At step S814, the word candidate number kk of the heading logical element E(ii,j) is incremented. It is then determined whether kk≦KK is satisfied (step S815). In this case, KK denotes a total number of the word candidates of the heading logical element E(ii,j). If kk≦KK is satisfied (step S815: YES), the procedure goes to step S811 to determine whether a data word candidate Weij-k exists in the specified area with respect to the incremented heading word candidate We(ii,j-kk).

On the other hand, if kk≦KK is not satisfied (step S815: NO), the word candidate number k of the data logical element Eij is incremented (step S816) and it is determined whether k≦K is satisfied (step S817). In this case, K denotes a total number of the word candidates of the data logical element Eij. If k≦K is satisfied (step S817: YES), the procedure goes to step S810 to determine whether the incremented data word candidate Weij-k exists in the specified area with respect to the heading word candidate We(ii,j-kk) (steps S810 and S811).

On the other hand, if k≦K is not satisfied (step S817: NO), the number ii of the heading logical element group G(ii) is incremented (step S818) and it is determined whether ii≦II is satisfied (step S819). In this case, II denotes a total number of the heading logical element groups G(ii). If ii≦II is satisfied (step S819: YES), the procedure goes to step S807 to read the incremented heading logical element groups G(ii).

If ii≦II is not satisfied (step S819: NO), the element number j of other heading logical elements is incremented (step S820) and it is determined whether j≦J is satisfied (step S821). In this case, J denotes a total number of other logical elements. If j≦J is satisfied (step S821: YES), the procedure goes to step S804 to determine whether the incremented logical element Eij is a data logical element.

On the other hand, if j≦J is not satisfied (step S821: NO), the logical element group number i is incremented (step S822) and it is determined whether i≦I is satisfied (step S823). In this case, I denotes a total number of the logical element groups Gi. If i≦I is satisfied (step S823: YES), the procedure goes to step S803 to determine whether the logical element Eij belonging to the incremented logical element group Gi is a data logical element (step S804).

If i≦I is not satisfied (step S823: NO), a sequence of the processing of the first generating unit 503 is terminated, and the procedure goes to step S605. As a result, the two-piece set candidates shown in FIGS. 7A to 7D are automatically generated.

FIGS. 9A to 9D are schematics detailing generation of (N+1)-piece set candidates. An (N+1)-piece set candidate is a combination of various heading items and one piece of data that can be identified by the heading items. The heading items of the form 100 are correlated with data located on the lower side, on the right side, and on the lower right side. In this description, an overlapping position on the lower side, the right side, or the lower right side of the various heading items is referred to as a specified area.

Therefore, the specified areas differ for each combination of the various heading items. The combination of various heading items and data located in the specified area thereof make up (N+1)-piece set candidates. With reference to FIGS. 7A to 7D, three-piece set candidates are described that are acquired by using N=2, i.e., by using two items (Item and Year) for the heading items.

In FIGS. 9A to 9D, heavy-line ovals indicate selected heading items, and thin-line ovals indicate data that can be identified by both of the heading items selected. Line segments linking the heavy-line ovals and the thin-line ovals indicate combinations formed. A combination of two heavy-line ovals and a thin-line oval is a three-piece set candidate.

FIG. 9A depicts the two-piece set candidates when the heading word candidate "consumable expense" of the element number E13 of the logical element group G1: Item is selected. Three two-piece set candidates are acquired due to the positional relationships of the "consumable expense" and the data word candidates of the logical element group G3. Other data are located on the upper right side with respect to the position of the "consumable expense" and are not eligible to form the two-piece set candidates.

FIG. 9B depicts the two-piece set candidates when the heading word candidate "19th year" of the element number E23 of the logical element group G2: Year is selected. Three two-piece set candidates are acquired due to the positional relationships of the "19th year" and the data word candidates of the logical element group G3.

FIG. 9C depicts the three-piece set candidate when the heading word candidate "consumable expense" of the element number E13 of the logical element group G1: Item and the heading word candidate "19th year" of the element number E23 of the logical element group G2: Year are selected. That is, only data (8,000) common to FIGS. 9A and 9B is included in the three-piece set candidate.

FIG. 9D depicts the three-piece set candidates when the heading word candidate "travel expense" of the element number E11 of the logical element group G1: Item and the heading word candidate "17th year" of the element number E21 of the logical element group G2: Year are selected. That is, nine pieces of data common to FIGS. 7A and 7B are included in the three-piece set candidates.

Figure 10:
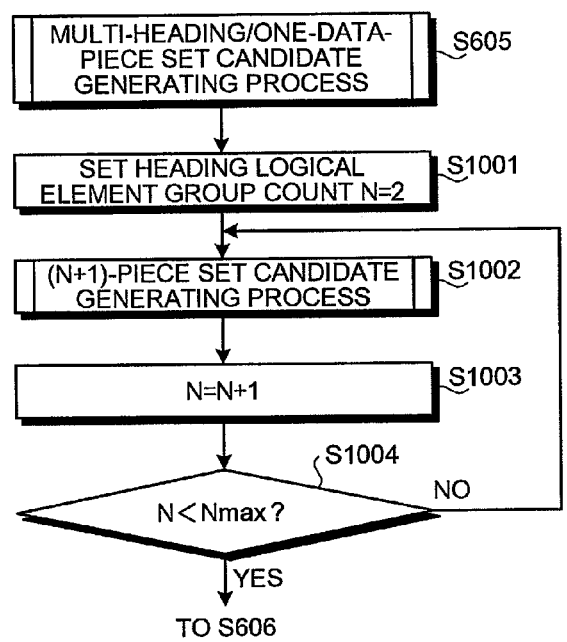
FIG. 10 is a flowchart detailing a multi-heading/one-data-piece set candidate generating process (step S605)

FIG. 10 is a flowchart detailing the multi-heading/one-data-piece set candidate generating process (step S605). As shown in FIG. 10, first, a heading logical element group count N is set to N=2 (step S1001) and an (N+1)-piece set candidate generating process is executed (step S1002). N is then incremented (step S1003) and it is determined whether N<Nmax is satisfied (step S1004). If N<Nmax is not satisfied (step S1004: NO), the procedure returns to step S1002. On the other hand, if N<Nmax is satisfied (step S1004: YES), a sequence of the processing of the second generating unit 504 is terminated. As a result, the (N+1)-piece set candidates shown in FIGS. 9C and 9D are automatically generated.

Figure 11:
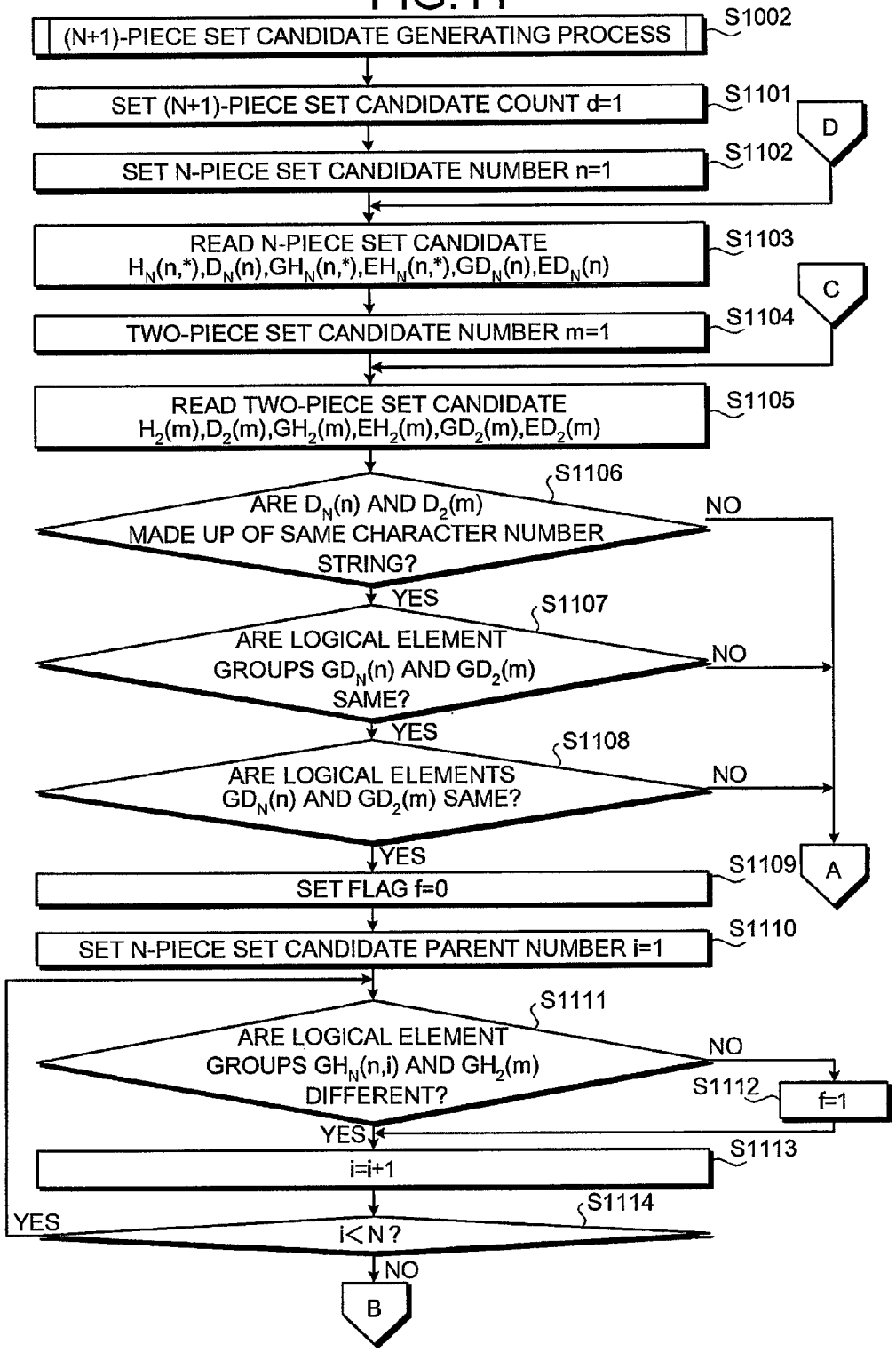
FIGS. 11 and 12 are flowcharts detailing an (N+1)-piece set candidate generating process.
Figure 12:
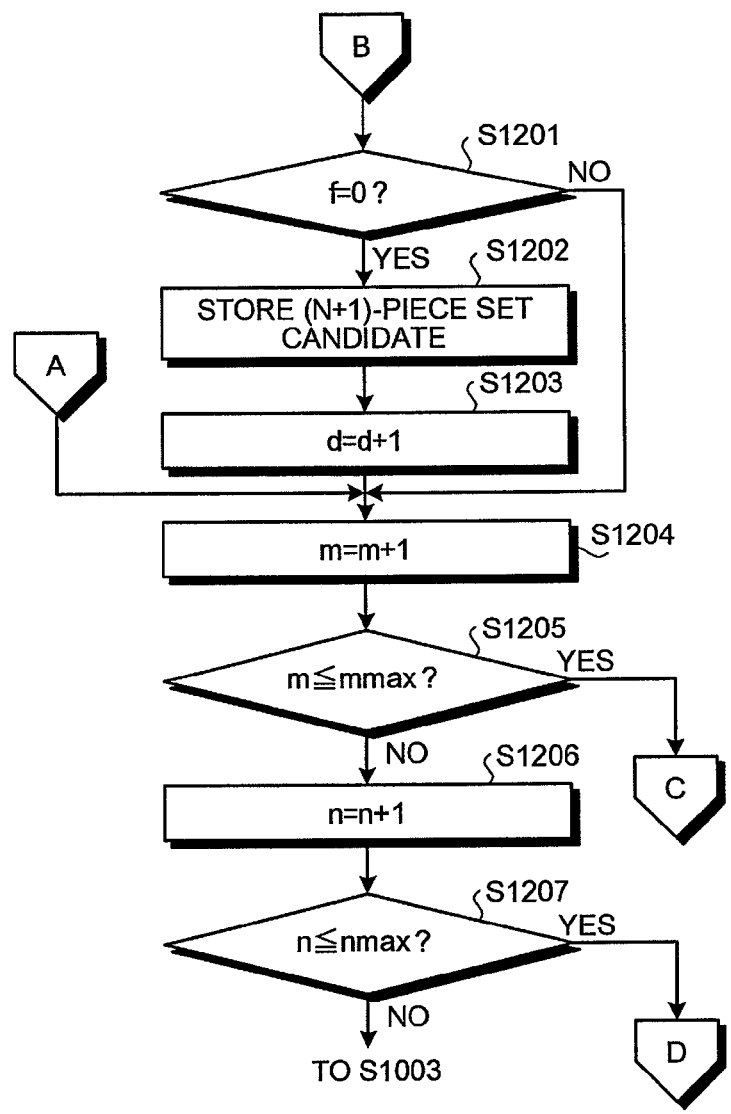

A detailed process procedure of the (N+1)-piece set candidate generating process shown in FIG. 10 is described. FIGS. 11 and 12 are flowcharts detailing the (N+1)-piece set candidate generating process. An (N+1)-piece set candidate is created based on N-piece set candidates and can be indicated by an arbitrary number of heading items. As shown in FIG. 11, an (N+1)-piece set candidate count d is set to d=1 (step S1101) and a number n of the N-piece set candidate is set to n=1 (step S1102).

Information related to an nth N-piece set candidate is read (step S1103). The information to be read is as follows.

$H_N(n,*)$: a *th heading word candidate of the nth N-piece set candidate
$D_N(n)$: a data word candidate of the nth N-piece set candidate
$GH_N(n,*)$: a *th logical element group number of $Hn(n,*)$
$EH_N(n,*)$: a *th logical element number of $Hn(n,*)$
$GD_N(n)$: a logical element group number of $D_N(n)$
$ED_N(n)$: a logical element number of $D_N(n)$ A number m of the two-piece set candidate is set to m=1 (step S1104) and information related to an mth two-piece set candidate is read (step S1105). The information to be read is as follows.

$H_2(m)$: a word candidate for the heading logical element of the mth two-piece set candidate
$D_2(m)$: a word candidate for the data logical element of the mth two-piece set candidate
$GH_2(m)$: a logical element group number of $H_2(m)$
$EH_2(m)$: a logical element number of $H_2(m)$
$GD_2(m)$: a logical element group number of $D_2(m)$
$ED_2(m)$: a logical element number of $D_2(m)$ It is determined whether $D_N(n)$ and $D_2(m)$ are made up of the same character number string (step S1106). If $D_N(n)$ and $D_2(m)$ are not made up of the same character number string (step S1106: NO), the procedure goes to step S1204 of FIG. 12. On the other hand, if $D_N(n)$ and $D_2(m)$ are made up of the same character number string (step S1106: YES), it is determined whether $D_N(n)$ and $D_2(m)$ are the same (step S1107).

If $D_N(n)$ and $D_2(m)$ are not the same (step S1107: NO), the procedure goes to step S1204 of FIG. 12. If $D_N(n)$ and $D_2(m)$ are the same (step S1107: YES), it is determined whether $GD_N(n)$ and $GD_2(m)$ are the same (step S1108). If $GD_N(n)$ and $GD_2(m)$ are not the same (step S1108: NO), the procedure goes to step S1204 of FIG. 12. On the other hand, if $GD_N(n)$ and $GD_2(m)$ are the same (step S1108: YES), a flag f is set to f=0 (step S1109).

A parent number i of the N-piece set candidate is set to i=1 (step S1110), and it is determined whether $GH_N(n,*)$ and $GH_2(m)$ are different (step S1111). If $GH_N(n,*)$ and $GH_2(m)$ are the same (step S1111: NO), the flag f is set to f=1 (step S1112), and the procedure goes to step S1113. If $GH_N(n,*)$ and $GH_2(m)$ are different (step S1111: YES), the parent number i is incremented (step S1113).

It is then determined whether i<N is satisfied (step S1114), and if i<N is satisfied (step S1114: YES), the procedure returns to step S1111. If i<N is not satisfied (step S1114: NO), i.e., in the case of i=N, the procedure goes to step S1201 of FIG. 12.

As shown in FIG. 12, it is determined whether the flag f=0 is satisfied (step S1201). If f=0 is not satisfied (step S1201: NO), the procedure goes to step S1204. If f=0 is satisfied (step S1201: YES), the candidate is stored as the (N+1)-piece set candidate (step S1202), and the (N+1)-piece set candidate count d is incremented (step S1203)

At step S1204, the number m of the two-piece set candidate is incremented (step S1204), and it is determined whether m≦mmax is satisfied (step S1205). In this case, mmax denotes a total number of the two-piece set candidates. If m≦mmax is satisfied (step S1205: YES), the procedure goes to step S1105 shown in FIG. 11.

On the other hand, if m≦mmax is not satisfied (step S1205: NO), the number n of the N-piece set candidate is incremented (step S1206), and it is determined whether n≦nmax is satisfied (step S1207). In this case, nmax denotes a total number of the N-piece set candidates. If n≦nmax is satisfied (step S1207: YES), the procedure goes to step S1103 shown in FIG. 11. If n≦nmax is not satisfied (step S1207: NO), the procedure goes to step S1003 shown in FIG. 10 to terminate the (N+1)-piece set candidate generating process.

FIGS. 13A to 14C are schematics detailing removal of the determined sets of the (N+1)-piece set candidates. The (N+1)-piece set candidate group generated by the (N+1)-piece set candidate generating unit includes those having a determined candidate and those not having a determined candidate. Data corresponding to plural headings are recursively determined by determining those having a determinable candidate and by removing the determined (N+1)-piece set candidates from the (N+1)-piece set candidate group.

With reference to FIGS. 13A to 13D and 14A to 14D, three-piece set candidates are described that are acquired by using N=2, i.e., by using two items (Item and Year) for the heading items. Heavy-line ovals indicate selected heading items, and thin-line ovals indicate data that can be identified by the heading items selected. Line segments linking the heavy-line ovals and the thin-line ovals indicate combinations formed. A combination of heavy-line ovals and a thin-line oval is a three-piece set candidate.

FIGS. 13A to 13D depict a forward process. FIG. 13A depicts the three-piece set candidate when the heading word candidate "travel expense" of the logical element group G1 and the heading word candidate "17th year" of the logical element group G2 are selected. That is, nine pieces of data common to FIGS. 7A and 7C make up the three-piece set candidates. At this stage, nine three-piece set candidates exist that include the heading word candidates "travel expense" and the "17th year".

As shown in FIG. 13B, the data word candidate "100,000" is determined/removed from the nine data word candidates "100,000" to "8,000" included in the three-piece set candidates with the heading word candidates "travel expense" and "17th year" from the state shown in FIG. 13A. Undetermined data word candidates are indicated by multiple thin-line ovals. Although nine data word candidates exist, since the data word candidate "100,000" is identified only by the heading word candidates "travel expense" and "17th year" and is not included as a candidate of other combinations of heading word candidates, the data word candidate "100,000" is automatically determined as an (N+1)-piece set and is removed from the (N+1)-piece set candidate group. That is, it is determined that the travel expense of the 17th year is 100,000.

FIG. 13C depicts a state of determining/removing the data word candidate "110,000" included in a three-piece set candidate with the heading word candidates "travel expense" and "18th year" and the data word candidate "400,000" included in a three-piece set candidate with the heading word candidates "equipment expense" and "17th year" from the eight undetermined data word candidates remaining. Neither of the three-piece set candidates have a data word candidate that is included as a candidate of other combinations of heading word candidates except for "travel expense" and "17th year" and, therefore, are automatically determined as an (N+1)-piece set and removed from the (N+1)-piece set candidate group. That is, it is determined that the equipment expense of the 17th year is 400,000 and that the travel expense of the 18th year is 110,000.

FIG. 13D depicts a forward process. Processing data from the upper left side toward the lowest right as shown in FIG. 13D is referred to as a forward process and the data word candidates are reduced one-by-one. Therefore, the heading word candidates of the logical element groups G1 and G2 identifying the data word candidates can be uniquely identified. Although plural data word candidates exist in the second to fourth rounds, any data word candidate may be determined first in the same round.

FIGS. 14A to 14C depict a backward process. FIG. 14A depicts an (N+1)-piece set candidate made up of the heading word candidate "consumable expense" of the logical element group G1, the heading word candidate "19th year" of the logical element group G2, and the data word candidate "8,000" identified by these two heading word candidates. Since only one data word candidate exists, the candidate is automatically determined as an (N+1)-piece set and removed from the (N+1)-piece set candidate group. That is, it is determined that the consumable expense of the 19th year is 8,000.

FIG. 14B depicts an (N+1)-piece set candidate made up of the heading word candidate "consumable expense" of the logical element group G1, the heading word candidate "18th year" of the logical element group G2, and the data word candidate "5,000" identified by these two heading word candidates. Although two data word candidates exist, since the data word candidate "8,000" is already determined in FIG. 14A, the candidates are narrowed down to the data word candidate "5,000". Therefore, the candidate is automatically determined as an (N+1)-piece set and removed from the (N+1)-piece set candidate group. That is, it is determined that the consumable expense of the 18th year is 5,000.

FIG. 14C depicts a backward process. Processing from the lowest right data toward the upper left side as shown in FIG. 14C is referred to as a backward process and the data word candidates are one-by-one reduced. Therefore, the heading word candidates of the logical element groups G1 and G2 identifying the data word candidates can uniquely be identified. Although plural data word candidates exist in the second to fourth rounds, any data word candidate can be determined first in the same round.

Figure 15:
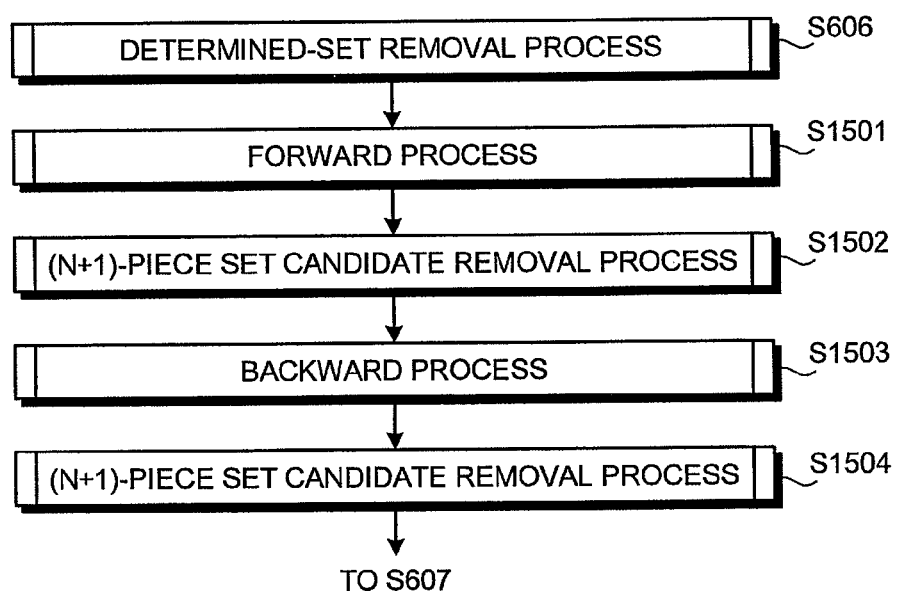
FIG. 15 is a flowchart detailing a determined set removal process (step S606)

FIG. 15 is a flowchart detailing the determined set removal process (step S606). As shown in FIG. 15, first, the forward process shown in FIGS. 13A to 13D is executed (step S1501) and the (N+1)-piece set candidate removal process is executed (step S1502). The backward process shown in FIGS. 14A to 14C is then executed (step S1503) and the (N+1)-piece set candidate removal process is executed (step S1504). As a result, the determined sets are retained, and the procedure goes to step S607.

In the determined set removal process (step S606), only the forward process (step S1501) and the (N+1)-piece set candidate removal process thereof (step S1502) may be executed, or only the backward process (step S1503) and the (N+1)-piece set candidate removal process thereof (step S1504) may be executed. However, by executing the forward process (step S1501) and the (N+1)-piece set candidate removal process thereof (step S1502) before the backward process (step S1503), the number of the output (N+1)-piece set candidates sent to the backward process (step S1503) can be reduced, and the determined sets can be removed efficiently in the backward process (step S1503).

Figure 16:
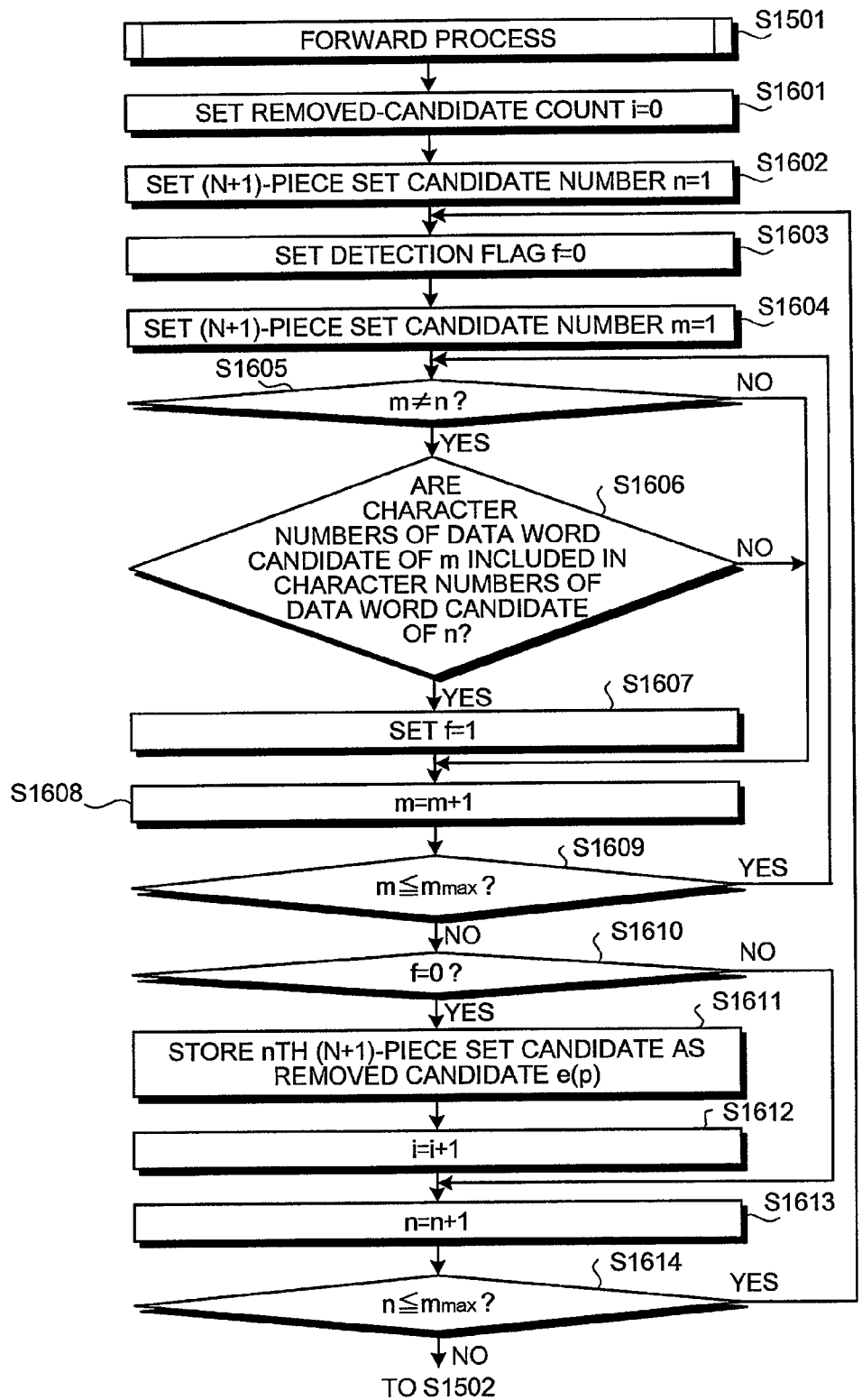
FIG. 16 is a flowchart detailing a forward process shown in FIGS. 13A to 13D.

FIG. 16 is a flowchart detailing the forward process shown in FIGS. 13A to 13D. As shown in FIG. 16, first, a removed-candidate count i is set to i=0 (step S1601), and an input (N+1)-piece set candidate number n is set to n=1 (step S1602). The detection flag f is set to f=0 (step S1603), and an output (N+1)-piece set candidate number m is set to m=1 (step S1604). It is then determined whether m≠n is satisfied (step S1605).

If m≠n is not satisfied (step S1605: NO), the procedure goes to step S1608. On the other hand, if m≠n is satisfied (step S1605: YES), it is determined whether the character numbers of the mth data word candidate are included in the character numbers of the nth data word candidate (step S1606); if included (step S1606: YES), the detection flag f is set to f=1 (step S1607), and the procedure goes to step S1608. On the other hand, if the character numbers of the mth data word candidate are not included (step S1606: NO), the detection flag f remains f=0 and the procedure goes to step S1608.

At step S1608, the output (N+1)-piece set candidate number m is incremented (step S1608) and it is determined whether m≦mmax is satisfied (step S1609). In this case, mmax denotes a (N+1)-piece set candidate count. If m≦mmax is satisfied (step S1609: YES), the procedure goes to step S1605. On the other hand, If msmmax is not satisfied (step S1609: NO), it is determined whether the detection flag f=0 is satisfied (step S1610).

If f=0 is not satisfied (step S1610: NO), the procedure goes to step S1613. If f=0 is satisfied (step S1610: YES), the nth (N+1)-piece set candidate is stored as a removed candidate (step S1611). The removed-candidate count i is then incremented (step S1612) and the input (N+1)-piece set candidate number n is incremented (step S1613) to determine whether n≦mmax is satisfied (step S1614).

If n≦mmax is satisfied (step S1614: YES), the procedure returns to step S1603. If n≦mmax is not satisfied (step S1614: NO), the forward process is terminated and the procedure goes to step S1502.

Figure 17:
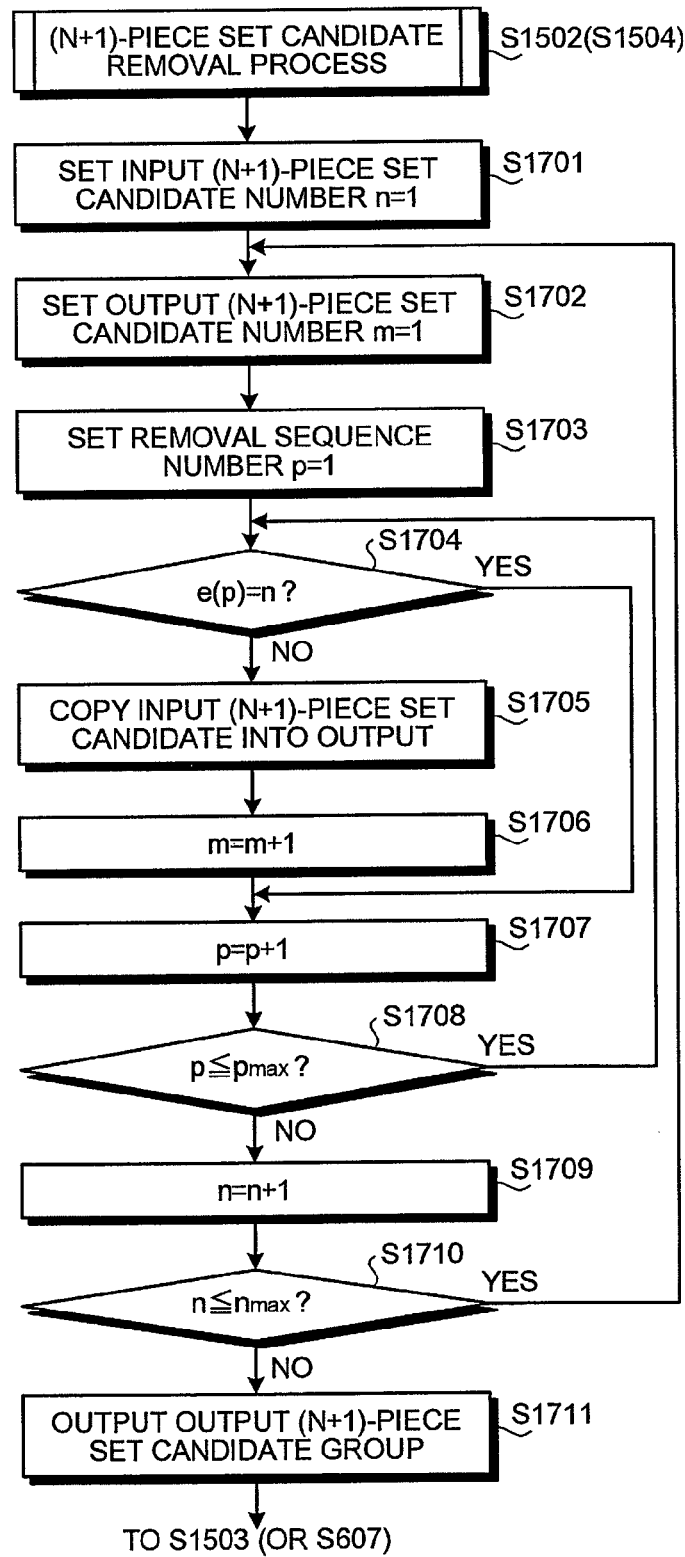
FIG. 17 is a flowchart detailing an (N+1)-piece set candidate removal process (step S1502 or S1504)

FIG. 17 is a flowchart detailing the (N+1)-piece set candidate removal process (step S1502 or S1504). As shown in FIG. 17, first, the input (N+1)-piece set candidate number n is set to n=1 (step S1701); the output (N+1)-piece set candidate number m is set to m=1 (step S1702); and a removal sequence number p is set to p=1 (step S1703).

The input (N+1)-piece set candidate is an output result of the preceding stage. That is, if the (N+1)-piece set candidate removal process is step S1502, the input (N+1)-piece set candidate is the (N+1)-piece set candidate output from the forward process (step S1501) shown in FIG. 16, and the (N+1)-piece set candidate is determined by this (N+1)-piece set candidate removal process (step S1502).

Figure 18:
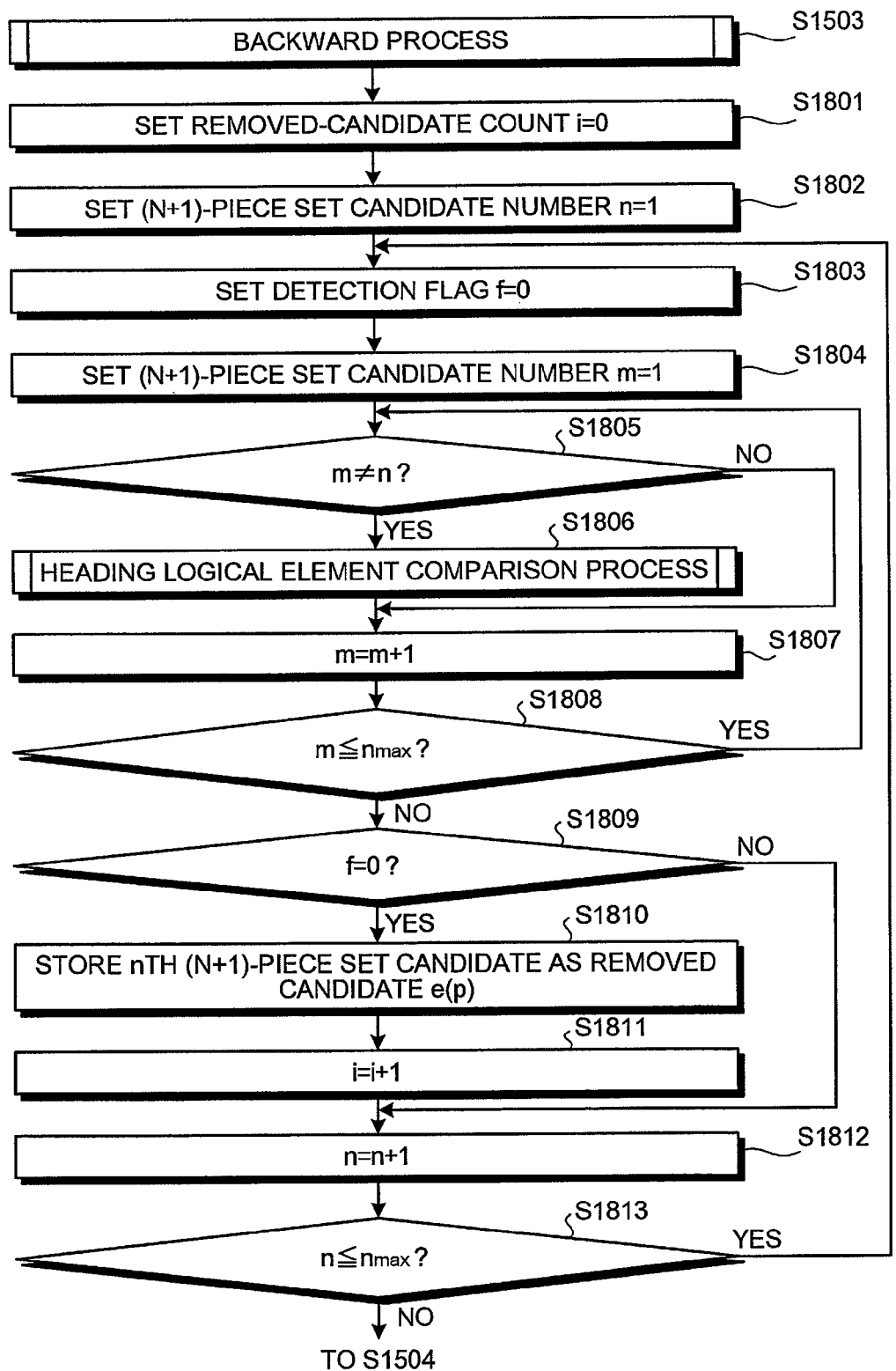
FIG. 18 is a flowchart detailing a backward process shown in FIGS. 14A to 14C.

On the other hand, if the (N+1)-piece set candidate removal process is step S1504, the input (N+1)-piece set candidate is the (N+1)-piece set candidate output from the backward process (step S1503) shown in FIG. 18, and the (N+1)-piece set candidate is determined by this (N+1)-piece set candidate removal process (step S1504).

With reference again to FIG. 17, after steps S1703, it is determined whether e(p)=n is satisfied (step S1704). In this case, e(p)is the input (N+1)-piece set candidate having the removal sequence number p (the removed candidate stored at step S1611 of FIG. 16).

If e(p)=n is satisfied (step S1704: YES), the procedure goes to step S1707. On the other hand, if e(p)=n is not satisfied (step S1704: NO), the nth input (N+1)-piece set candidate is copied into the output (N+1)-piece set candidate group (step S1705). The output (N+1)-piece set candidate number m is then incremented (step S1706) and the removal sequence number p is incremented (step S1707). It is determined whether p≦pmax is satisfied (step S1708). In this case, pmax denotes a (N+1)-piece set candidate count corresponding to the removed candidates.

If p≦pmax is satisfied (step S1708: YES), the procedure goes back to step S1704. If p≦pmax is not satisfied (step S1708: NO), the input (N+1)-piece set candidate number n is incremented (step S1709) and it is determined whether n≦nmax is satisfied (step S1710). In this case, nmax denotes a (N+1)-piece set candidate count.

If n≦nmax is satisfied (step S1710: YES), the procedure returns to step S1702. On the other hand, if n≦nmax is not satisfied (step S1710: NO), the output (N+1)-piece set candidate group acquired at step S1705 is output (step S1711). If the (N+1)-piece set candidate removal process is step S1502, the procedure goes to step S1503, and if the process is step S1504, the procedure goes to step S607.

FIG. 18 is a flowchart detailing the backward process shown in FIGS. 14A to 14C. As shown in FIG. 18, first, a removed-candidate count i is set to i=0 (step S1801), and an input (N+1)-piece set candidate number n is set to n=1 (step S1802). The detection flag f is set to f=0 (step S1803), and an output (N+1)-piece set candidate number m is set to m=1 (step S1804). It is then determined whether m≠n is satisfied (step S1805).

If m≠n is not satisfied (step S1805: NO), the procedure goes to step S1807. On the other hand, if m≠n is satisfied (step S1805: YES), a heading logical element comparison process is executed (step S1806). The heading logical element comparison process (step S1806) is described hereinafter.

After the heading logical element comparison process (step S1806), the (N+1)-piece set candidate number m is incremented (step S1807) and it is determined whether m≦nmax is satisfied (step S1808). In this case, nmax denotes a (N+1)-piece set candidate count. If m≦nmax is satisfied (step S1808: YES), the procedure returns to step S1805. If m≦nmax is not satisfied (step S1808: NO), it is determined whether the detection flag f is f=0 (step S1809).

If f=0 is not satisfied (step S1809: NO), the procedure goes to step S1812. On the other hand, if f=0 is satisfied (step S1809: YES), the nth (N+1)-piece set candidate is saved as a removed candidate (step S1810). The removed-candidate count i is then incremented (step S1811) and the (N+1)-piece set candidate number n is incremented (step S1812) to determine whether n≦mmax is satisfied (step S1813).

If nsmmax is satisfied (step S1813: YES), the procedure returns to step S1803. If n≦mmax is not satisfied (step S1813: NO), the backward process is terminated and the procedure goes to step S1504.

FIG. 19 is a flowchart detailing the heading logical element comparison process (step S1806) shown in FIG. 18. As shown in FIG. 19, a heading number j of the (N+1)-piece set candidate number n is set to j=1 (step S1901); a heading number k of the (N+1)-piece set candidate number m is set to k=1 (step S1902); and a heading same-value flag ff is set to ff=0 (step S1903).

It is then determined whether a logical element of the heading word candidate of the heading number j is equivalent to a logical element of the heading word candidate of the heading number k (step S1904). If the logical elements are not equivalent (step S1904: NO), the heading same-value flag ff is incremented (step S1906), and the procedure goes to step S1909. On the other hand, if the logical elements are equivalent (step S1904: YES), it is determined whether a character number string of the heading word candidate of the heading number j is equivalent to a character number string of the heading word candidate of the heading number k (step S1905).

If the character number strings are equivalent (step S1905: YES), the heading same-value flag ff is incremented (step S1906), and the procedure goes to step S1909. On the other hand, if the character number strings are not equivalent (step S1905: NO), the heading number k is incremented (step S1907) and it is determined whether k≦kmax is satisfied (step S1908). In this case, kmax denotes a heading count. If k≦kmax is satisfied (step S1908: YES), the procedure goes back to step S1903 and the heading same value flag is reset to ff=0.

On the other hand, if k≦kmax is not satisfied (step S1908: NO), the heading number j is incremented (step S1909) and it is determined whether j=jmax is satisfied (step S1910). If j=jmax is not satisfied (step S1910: NO), it is determined whether the heading same-value flag ff is ff=kmax (step S1911). In this case, kmax denotes a heading count. If ff=kmax is not satisfied (step S1911: NO), the heading logical element comparison process (step S1806) is terminated, and the procedure goes to step S1807. If ff=kmax is satisfied (step S1911: YES), the detection flag f is set to f=1 (step S1912) to terminate the heading logical element comparison process (step S1806), and the procedure goes to step S1807.

As described, according to the embodiment above, a logical structure can be analyzed from the form 100 shown in FIG. 1A. The embodiment above is applicable to the form 100 independent of the order and layout of tables and headings.

Figure 20A:
FIGS. 20A and 20B are schematics of other examples of a form.
Figure 20B:
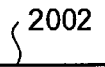

FIGS. 20A and 20B are schematics of other examples of a form. A form 2001 of FIG. 20A is a form with a travel expense, an equipment expense, and a consumables expense of the 17th year written in one line. A form 2002 of FIG. 20B is a form with a travel expense, an equipment expense, and a consumable expense of the 17th year and a travel expense, an equipment expense, and a consumable expense of the 18th year written in two lines, respectively.

FIG. 21 is a schematic of two-piece set candidates obtained from the form 2001 shown in FIG. 20A. In FIG. 21, heavy-line ovals indicate heading word candidates, and thin-line ovals indicate data word candidates. If the form 2001 is represented in one line, a data word candidate capable of making up a two-piece set with a heading word candidate is located on the right side of the heading word candidate. A two-piece set candidate is generated with the use of this property.

As shown in FIG. 21, since a two-piece set candidate group 2101 has three data word candidates, three two-piece set candidates are generated ({17th year, 100,000}, {17th year, 400,000}, and {17th year, 3,000}). Since a two-piece set candidate group 2102 also has three data word candidates, three two-piece set candidates are generated ({travel expense, 100,000}, {travel expense, 400,000}, and {travel expense, 3,000}).

Since a two-piece set candidate group 2103 has two data word candidates, two two-piece set candidates are generated ({equipment expense, 400,000} and {equipment expense, 3,000}). Since a two-piece set candidate group 2104 has one data word candidate, the candidates are directly determined as a two-piece set ({consumable expense, 3,000}).

FIGS. 22A to 22C are schematics of (N+1)-piece set candidates obtained from the form 2001 shown in FIG. 20A. The two heading logical elements (Item and Year) are used here, which leads to N=2. As shown in FIG. 22A, since a three-piece set candidate group 2201 has three data word candidates, three three-piece set candidates are generated ({17th year, travel expense, 100,000}, {17th year, travel expense, 400,000}, and {17th year, travel expense, 3,000}).

Among the three three-piece set candidates, since the data word candidate "100,000" of {17th year, travel expense, 100, 000} is not used in the other three-piece set candidate groups 2202 and 2203, {17th year, travel expense, 100,000} is determined/removed by the forward process (step S1501).

As shown in FIG. 22B, since the three-piece set candidate group 2202 has two data word candidates, two three-piece set candidates are generated ({17th year, equipment expense, 400,000} and {17th year, equipment expense, 3,000}). As shown in FIG. 22C, since the three-piece set candidate group 2203 has one data word candidate, a three-piece set {17th year, consumable expense, 3,000} is directly generated. Since the three-piece set candidate (group) 2203 only has the data word candidate "3,000", the candidate is determined/removed by the backward process (step S1503).

Figure 23A:
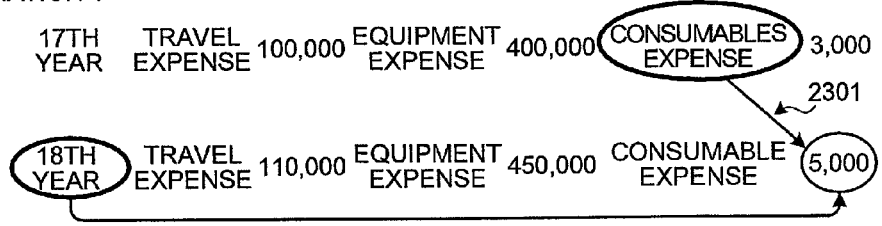
FIGS. 23A and 23B are schematics of two-piece set candidates obtained from the form shown in FIG. 20B.
Figure 23B:
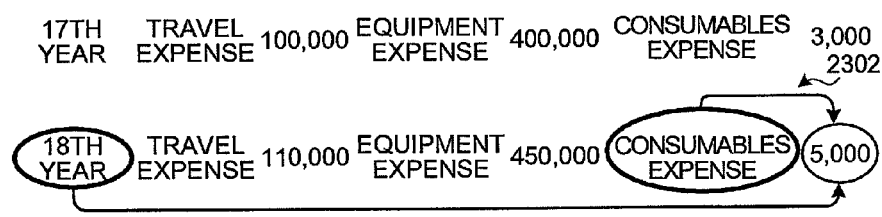

FIGS. 23A and 23B are schematics of two-piece set candidates obtained from the form 2002 shown in FIG. 20B. In FIGS. 23A and 23B, heavy-line ovals indicate heading word candidates, and thin-line ovals indicate data word candidates. If the form 2002 is represented in plural lines (in this case, two), a data word candidate capable of making up a two-piece set with a heading word candidate is located on the right, lower, or lower right side of the heading word candidate. A two-piece set candidate is generated with the use of this property.

FIGS. 23A and 23B depict three-piece set candidates when selecting "18th year" and "consumable expense" as the heading word candidates for the same data word candidate "5,000". FIG. 23A depicts a three-piece set candidate 2301 when "consumable expense" in the line of the 17th-year is selected, and FIG. 23B depicts a three-piece set candidate 2302 when "consumable expense" in the line of the 18th-year is selected.

If the same heading word candidate exists in plural, as "consumable expense" above, a three-piece set candidate cannot be uniquely identified. Therefore, the correct heading word candidate is determined from the positions of each of the heading word candidates "consumable expense" with respect to the position of the data word candidate "5,000" common to both. This process is executed by the heading word candidate evaluating unit 506 shown in FIG. 5.

Figure 24:
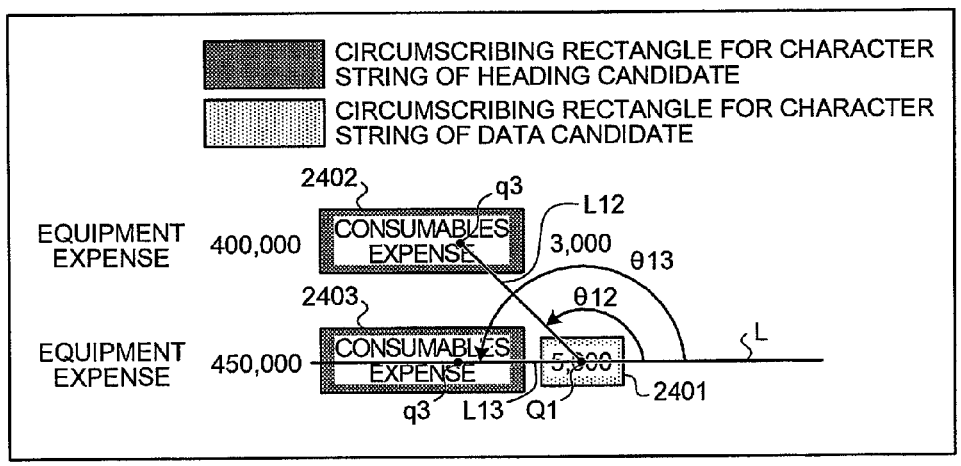
FIG. 24 is a schematic of a heading word candidate evaluating technique when the same heading word candidate exists in plural.

FIG. 24 is a schematic of a heading word candidate evaluating technique when the same heading word candidate "consumable expense" exists in plural. Although a data word candidate identifiable by a heading word candidate can be identified when located at the right, lower, or lower right side of the heading word candidate on the form, if the right side and the lower right side compete against each other as shown in FIG. 24, the right side is preferentially adopted. Similarly, if the lower side and the lower right side compete against each other, the lower side is preferentially adopted. That is, a heading word candidate that is located horizontally or perpendicularly (or substantially horizontally or substantially perpendicularly) to a data word candidate is given priority.

More specifically, a proper heading word candidate can be selected by obtaining line segments L12 and L13 linking centers q3 of circumscribing rectangles 2402 and 2403 of the heading word candidates and a center Q1 of the circumscribing rectangle 2401 of the data word candidate and by evaluating the line segments L12 and L13 relative to a horizontal line L passing through the center Q1 of the data word candidate, i.e., by evaluating angles θ12 and θ13.

The angle θ12 is an angle formed by the horizontal line L and the line segment L12, and the angle θ13 is an angle formed by the horizontal line L and the line segment L13. For each angle, sin 2θ is obtained. The angles θ12 and θ13 are substituted for θ. If a value of sin 2θ becomes zero as a result, it is determined that a heading word candidate is horizontally or perpendicularly (or substantially horizontally or substantially perpendicularly) located with respect to the data word candidate and the heading word candidate is selected as a proper heading word candidate.

Since θ13 is 180 degrees in the example shown in FIG. 24, a value of sin 2θ becomes zero and the heading word candidate of the circumscribing rectangle 2403 is selected. That is, as shown in FIGS. 23A and 23B, the three-piece set candidate of FIG. 23B is correct.

Figure 25:
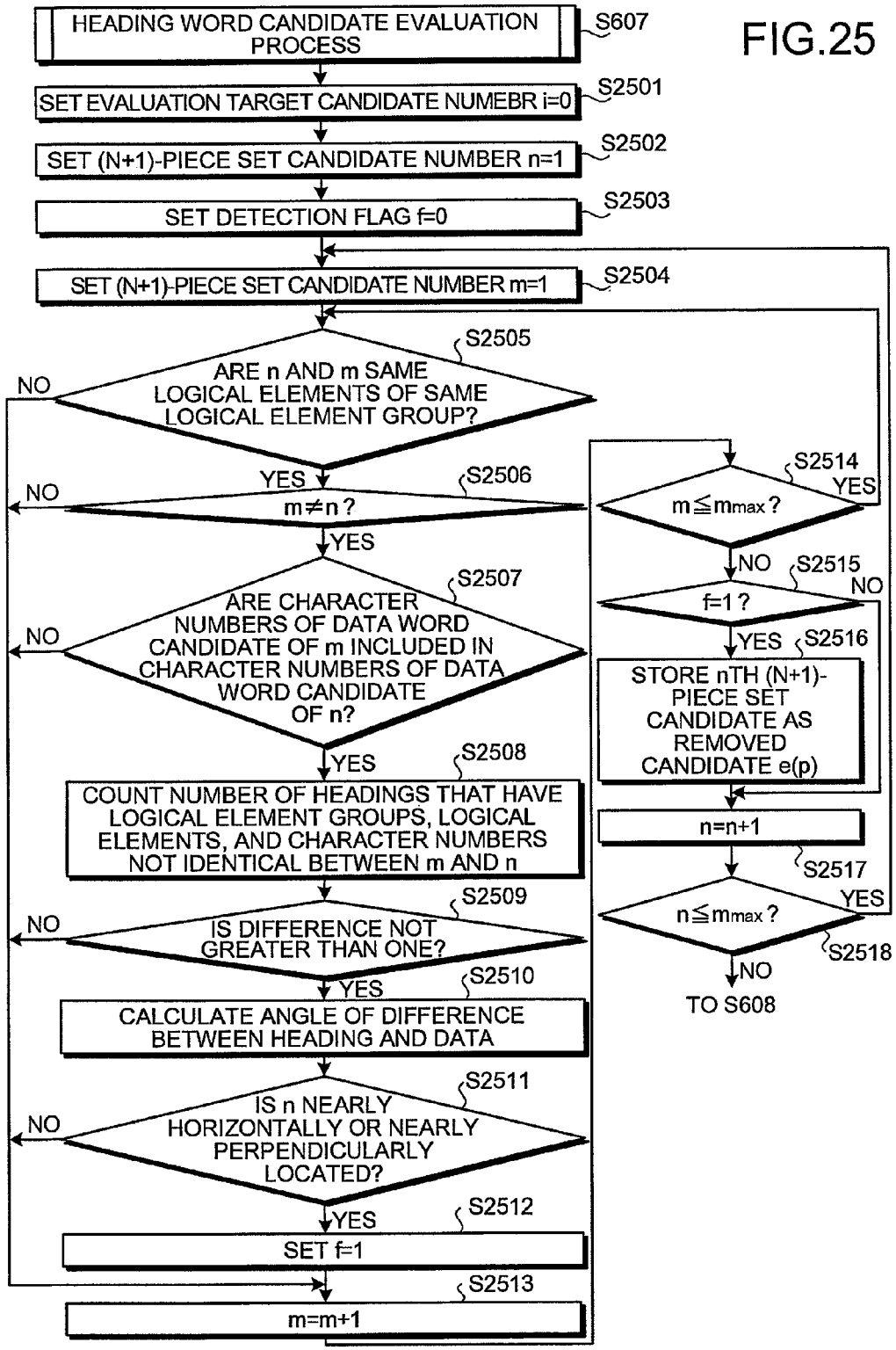
FIG. 25 is a detailed flowchart of a heading word candidate evaluation process (step S607)

FIG. 25 is a detailed flowchart of the heading word candidate evaluation process (step S607). As shown in FIG. 25, first, an evaluation target candidate count i is set to i=0 (step S2501); an (N+1)-piece set candidate number n is set to n=1 (step S2502); the detection flag f is set to f=0 (step S2503), and another (N+1)-piece set candidate number m is set to m=1 (step S2504).

It is determined whether the (N+1)-piece set candidate of the number n and the (N+1)-piece set candidate of the number m are the same logical elements of the same logical element group (step S2505). If the candidates are not the same logical elements of the same logical element group (step S2505: NO), the procedure goes to step S2513. On the other hand, if the candidates are the same logical elements of the same logical element group (step S2505: YES), it is then determined whether m≠n is satisfied (step S2506).

If m≠n is not satisfied (step S2506: NO), the procedure goes to step S2513. If m≠n is satisfied (step S2506: YES), it is determined whether the character numbers of the data word candidate of the (N+1)-piece set candidate of the number m are included in the character numbers of the data word candidate of the (N+1)-piece set candidate of the number n (step S2507).

If the character numbers are not included (step S2507: NO), the procedure goes to step S2513; if included (step S2507: YES), the number of heading word candidates having logical element groups, logical elements, and character numbers that are not identical between the (N+1)-piece set candidate of the number m and the (N+1)-piece set candidate of the number n (step S2508) is counted.

It is then determined whether the difference of the heading word candidate count is not greater than one (step S2509). If the difference is greater than one (step S2509: NO), the procedure goes to step S2513. If the difference is not greater than one (step S2509: YES), an angle between the heading word candidate and the data word candidate is calculated (step S2510). It is then determined whether the location of the heading word candidate of the (N+1)-piece set candidate of the number n is located horizontally or perpendicularly (or substantially horizontally or substantially perpendicularly) to the position of the data word candidate (step S2511).

If not located horizontally or perpendicularly (or substantially horizontally or substantially perpendicularly) (step S2511: NO), the procedure goes to step S2513I; if located horizontally or perpendicularly (or substantially horizontally or substantially perpendicularly) (step S2512: NO), the detection flag f is set to f=1 (step S2512), and m is incremented (step S2513).

It is determined whether m≦mmax is satisfied (step S2514). In this case, mmax denotes a (N+1)-piece set candidate count. If m≦mmax is satisfied (step S2514: YES), the procedure goes back to step S2505. On the other hand, If m≦mmax is not satisfied (step S2514: NO), it is determined whether the detection flag f is f=1 (step S2515).

If f=1 is not satisfied (step S2515: NO), the procedure goes to step S2517 since the candidate is not a target of the removal of candidates. On the other hand, if f=0 is satisfied (step S2515: YES), the nth (N+1)-piece set candidate is stored as a removed candidate e(p) (step S2516) and the number n is incremented (step S2517).

It is then determined whether n≦mmax is satisfied (step S2518). If n≦mmax is satisfied (step S2518: YES), the procedure goes back to step S2504. If n≦mmax is not satisfied (step S2518: NO), the heading word candidate evaluation process is terminated. The removed candidate e(p) stored at step S2516 is output as the determined (N+1)-piece set.

Figure 26:
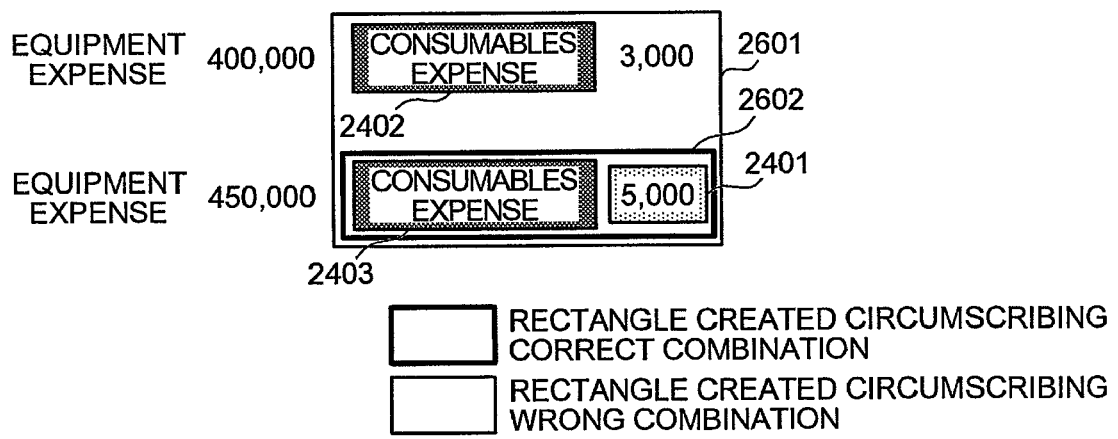
FIG. 26 is a schematic of another evaluating technique of the heading word candidate when the same heading word candidate exists in plural.

FIG. 26 is a schematic of another evaluating technique of the heading word candidate when the same heading word candidate "consumable expense" exists in plural. FIG. 26 depicts an example of adopting a proper heading word candidate in accordance with a size (an area) of a new circumscribing rectangle containing the circumscribing rectangles of a set of the heading word candidate and the circumscribing rectangle of the data word candidate. A heading word candidate having a smaller circumscribing rectangle is adopted.

A circumscribing rectangle 2601 is a rectangle circumscribing the circumscribing rectangle 2401 of the data word candidate and the circumscribing rectangle 2402 of the heading word candidate, and a circumscribing rectangle 2602 is a rectangle circumscribing the circumscribing rectangle 2401 of the data word candidate and the circumscribing rectangle 2403 of the heading word candidate. Since the circumscribing rectangle 2602 is smaller compared to the circumscribing rectangle 2601, the heading word candidate of the circumscribing rectangle 2403 included in the circumscribing rectangle 2602 is selected as the proper heading word candidate.

Figure 27:
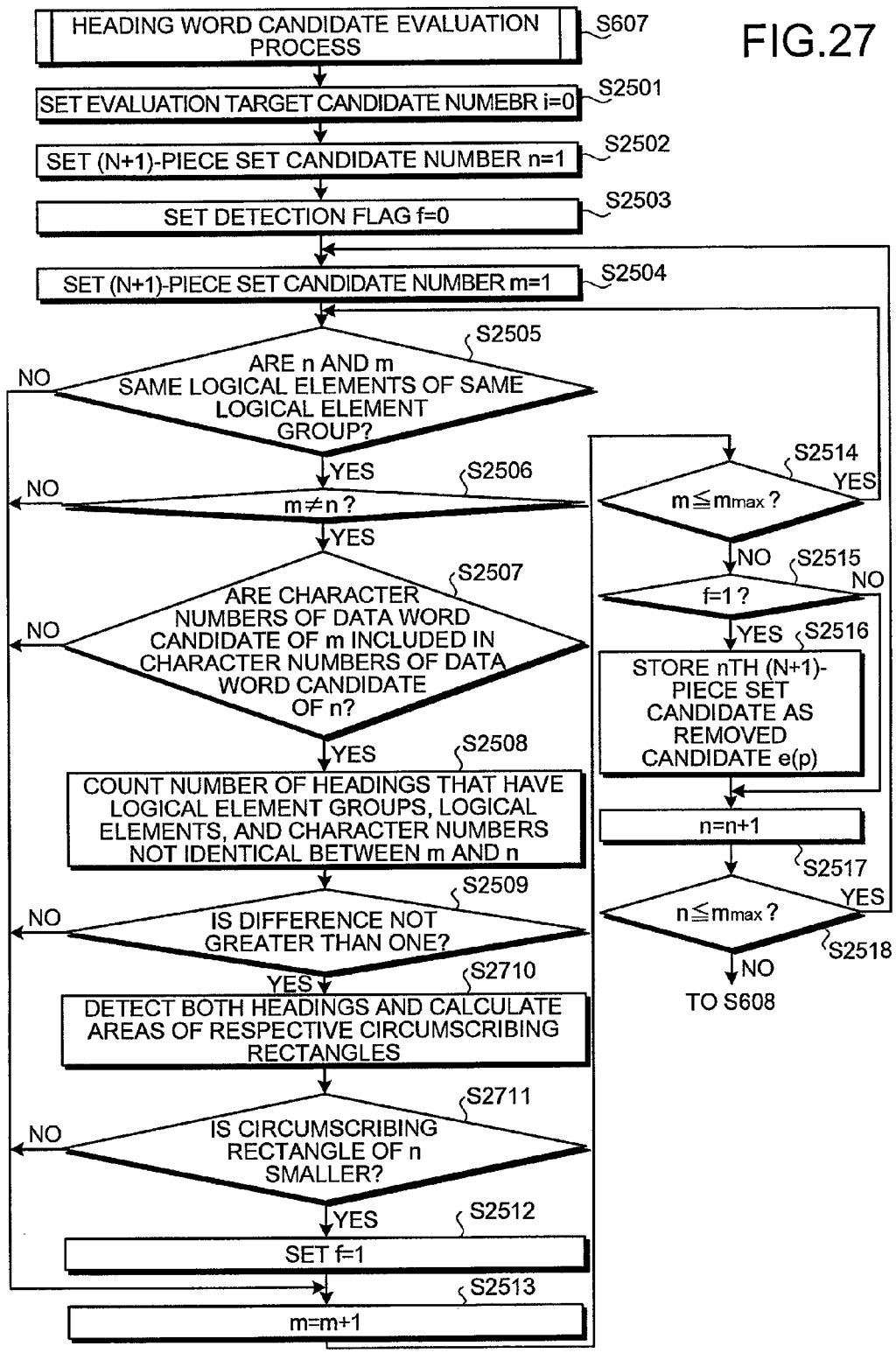
FIG. 27 is a flowchart detailing another procedure of the heading word candidate evaluation process (step S607)

FIG. 27 is a flowchart detailing another procedure of the heading word candidate evaluation process (step S607). In the flowchart of FIG. 27, steps S2510 and S2511 of the flowchart of FIG. 25 are replaced with steps S2710 and S2711, and other steps are the same as those of FIG. 25.

At step S2710, the heading word candidates of the numbers n and m are detected and combined with a common data word candidate to generate a circumscribing rectangle of the number n including the circumscribing rectangle of the heading word candidate of the number n and the circumscribing rectangle of the data word candidate, and a circumscribing rectangle of the number m including the circumscribing rectangle of the heading word candidate of the number m and the circumscribing rectangle of the data word candidate, and the areas of the both circumscribing rectangles are calculated. The procedure then goes to step S2711.

At step S2711, it is determined whether the area of the circumscribing rectangle of the number n is smaller than the area of the circumscribing rectangle of the number m. If the area is not smaller (step S2711: NO), the procedure goes to step S2513. On the other hand, if the area is smaller (step S2711: YES), the procedure goes to step S2512. The subsequent process is the same as that of FIG. 25.

According to the heading word candidate evaluating unit 506, if the same heading word candidate exists in plural, a proper heading word candidate can be identified, and higher accuracy can be achieved in the logical structure analysis of a form.

The data word candidate evaluating unit 507 shown in FIG. 5 is described in detail. FIGS. 28A to 28E are schematics of another example of a form. As shown in FIG. 28A, heading items ("travel expense" and "equipment expense") and data ("100,000" and "400,000") of a form 2800 are written in two layers in parallel in some portions. Although a person can intuitively know that the travel expense is 100,000 (yen) and that the equipment expense is 400,000 (yen), this logical structure cannot uniquely be identified as described above.

Figure 28:
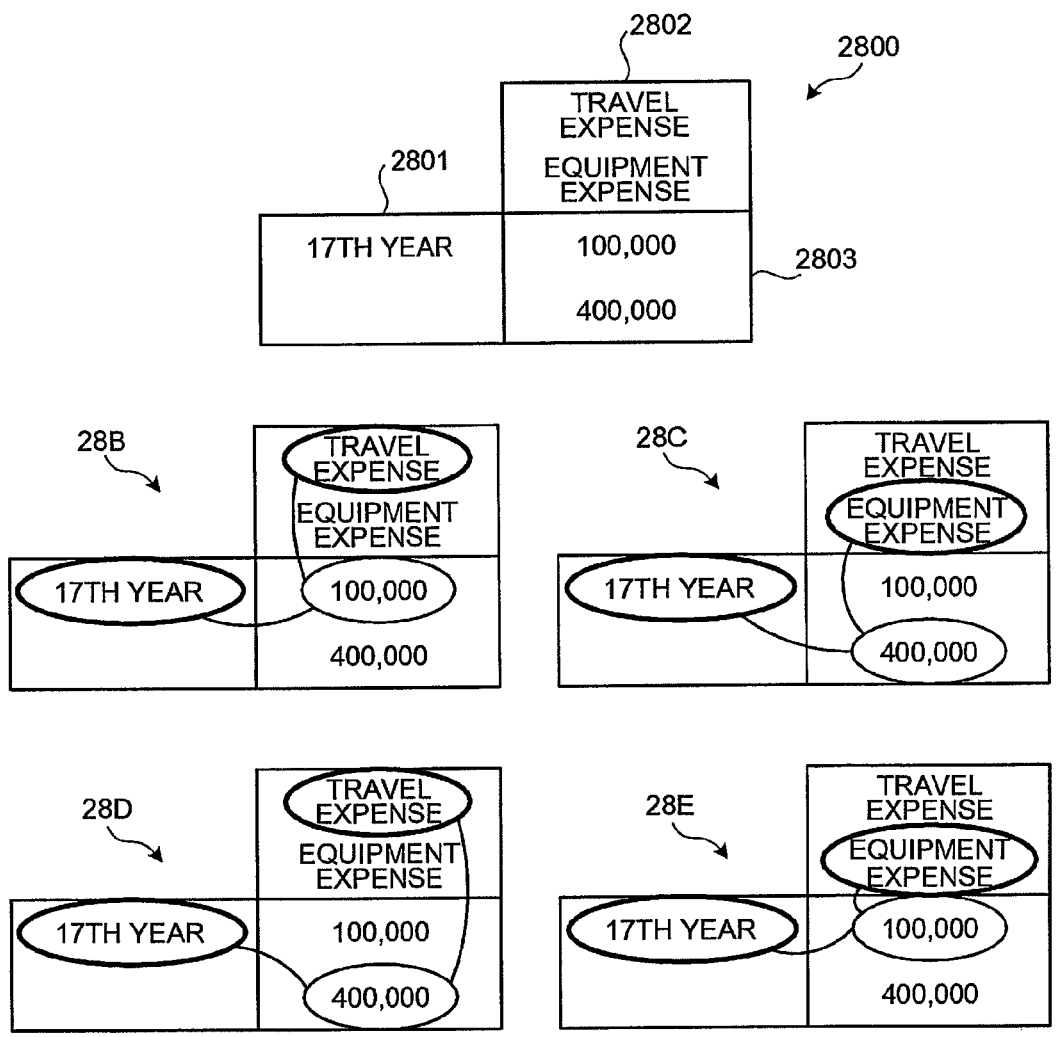
FIGS. 28A to 28E are schematics of another example of a form.

In the example of FIG. 28, although a heading item 2801 only has a heading item candidate "17th year", a heading item 2802 has two heading item candidates ("travel expense" and "equipment expense"). Similarly, a data item 2803 has two data item candidates ("100,000" and "400,000"). Therefore, four patterns of three-piece set candidates 28B to 28E exist as shown in FIG. 28. In FIG. 28, heavy-line ovals indicate heading word candidates, and thin-line ovals indicate data word candidates.

The three-piece set candidate 28B is made up of the heading word candidate "17th year", the heading word candidate "travel expense", and the data word candidate "100,000". The three-piece set candidate 28C is made up of the heading word candidate "17th year", the heading word candidate "equipment expense", and the data word candidate "400,000".

The three-piece set candidate 28D is made up of the heading word candidate "17th year", the heading word candidate "travel expense", and the data word candidate "400,000". The three-piece set candidate 28E made up of the heading word candidate "17th year", the heading word candidate "equipment expense", and the data word candidate "100,000".

After identifying the three-piece set candidates 28B to 28E, a distance is calculated between a heading word candidate selected from the heading item 2802 and a data word candidate selected from the data items to identify three-piece set candidates having the same calculated distance among the three-piece set candidates 28B to 28E.

FIGS. 29A and 29B are schematics of evaluation examples of combinations of the three-piece set candidates. FIG. 29A depicts an evaluation example of a combination of the three-piece set candidates 28B and 28C, and FIG. 29B depicts an evaluation example of a combination of the three-piece set candidates 28D and 28E. Distances calculated in the three-piece set candidates 28B to 28E are db, dc, dd, and de, respectively. The distances db and dc are equivalent in FIG. 29A and the distances dd and de are equivalent in FIG. 29B. Therefore, the three-piece set candidates 28B and 28C are selected as the proper three-piece set candidates. When proper three-piece set candidates are actually selected, distances are obtained between the heading word candidates and the data word candidates, and the three-piece set candidate having a smaller variance is selected.

Figure 30:
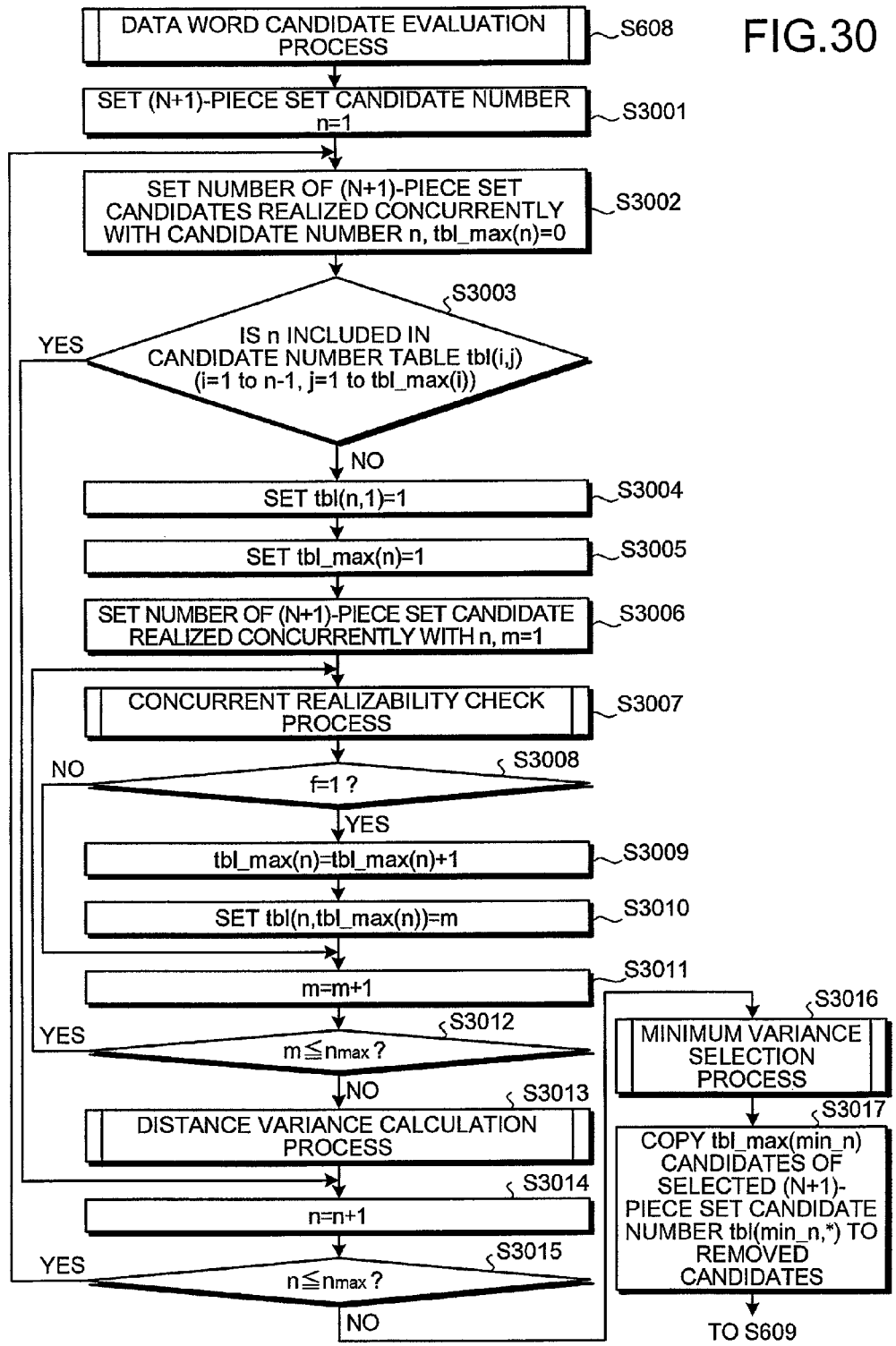
FIG. 30 is a flowchart detailing a data word candidate evaluation process (step S608)

FIG. 30 is a flowchart detailing the data word candidate evaluation process (step S608). As shown in FIG. 30, an (N+1)-piece set candidate number n is set to n=1 (step S3001), and the number tbl_max of (N+1)-piece set candidates realized concurrently with the candidate number n is set to tbl_max(n)=0 (step S3002). It is then determined whether the candidate number n is included in a candidate number table tbl(i,j) (where i=1 to n-1, and j=1 to tbl_max(i)) (step S3003).

If the candidate number n is included (step S3003: YES), the procedure goes to step S3014. If the candidate number n is not included (step S3003: NO), the candidate number table tbl(i,j) is set to tbl(n,1)=1 (step S3004) and tbl_max(n)=1 is set (step S3005).

A candidate number m of the concurrently realized candidate of the (N+1)-piece set candidate of the candidate number n is set to m=1 (step S3006). A concurrent realizability check process is executed (step S3007). The concurrent realizability check process (step S3007) is described hereinafter.

A concurrent realizability flag is defined as f, and it is determined whether the concurrent realizability flag f is f=1 (step S3008). If f=1 is not satisfied (step S3008: NO), the procedure goes to step S3011. If f=1 is satisfied (step S3008: YES), the concurrently realized candidate count tbl_max(n) is set to tbl_max(n)=tbl_max(n)+1 (step S3009), and the candidate number table tbl(i,j) is set to tbl(n,tbl_max(n))=m (step S3010).

The concurrently realized candidate number m is then realized (step S3011). It is determined whether m≦nmax is satisfied (step S3012). In this case, nmax denotes a (N+1)-piece set candidate count. If m≦nmax is satisfied (step S3012: YES), the procedure goes to step S3007. If m≦nmax is not satisfied (step S3012: NO), a distance variance calculation process is executed (step S3013). The distance variance calculation process (step S3013) is described hereinafter.

The candidate number n is then incremented (step S3014), and it is determined whether n≦nmax is satisfied (step S3015). If n≦nmax is satisfied (step S3015: YES), the procedure goes to step S3002. If n≦nmax is not satisfied (step S3015: NO), a minimum variance selection process is executed (step S3016). The minimum variance selection process (step S3016) is described hereinafter.

Subsequently, tbl_max(min_n) candidates of the (N+1)-piece set candidate number tbl(min_n,*) selected in the minimum variance selection process (step S3016) are copied to the removed candidates (step S3017). The procedure goes to step S609.

FIG. 31 is a flowchart detailing the concurrent realizability check process (step S3007). As shown in FIG. 31, first, the concurrent realizability flag f is set to f=0 (step S3101), and it is determined whether a logical element group of the data word candidate of the (N+1)-piece set candidate of the candidate number n is equivalent to a logical element group of the data word candidate of the (N+1)-piece set candidate of the candidate number m (step S3102). If the groups are not equivalent (step S3102: NO), the concurrent realizability flag f is set to f=0 (step S3114), and the procedure goes to step S3008.

On the other hand, if the groups are equivalent (step S3102: YES), it is determined whether a logical element of the data word candidate of the (N+1)-piece set candidate of the candidate number n is equivalent to a logical element of the data word candidate of the (N+1)-piece set candidate of the candidate number m (step S3103). If the elements are equivalent (step S3103: YES), the concurrent realizability flag f is set to f=0 (step S3114), and the procedure goes to step S3008.

If the elements are not equivalent (step S3103: NO), it is determined whether the same character number exists in a character number string of the data word candidate of the (N+1)-piece set candidate of the candidate number n and a character number string of the data word candidate of the (N+1)-piece set candidate of the candidate number m (step S3104). If the same character number exists (step S3104: YES), the concurrent realizability flag f is set to f=0 (step S3114), and the procedure goes to step S3008.

On the other hand, if the same character number does not exist (step S3104: NO), a heading number p of the candidate number n is set to p=0 (step S3105), and a heading number q of the candidate number m is set to q=0 (step S3106). It is determined whether a logical element group of the heading number p is equivalent to a logical element group of the heading number q (step S3107). If the groups are not equivalent (step S3107: NO), the concurrent realizability flag f is set to f=0 (step S3114), and the procedure goes to step S3008.

If the groups are equivalent (step S3107: YES), it is determined whether a logical element of the heading number p is equivalent to a logical element of the heading number q (step S3108). If the elements are equivalent (step S3108: YES), the procedure goes to step S3111.

On the other hand, if the elements are not equivalent (step S3108: NO), the concurrent realizability flag f is set to f=1 (step S3109) and the heading number q is incremented (step S3110). It is then determined whether q≦pmax is satisfied (step S3111). In this case, pmax denotes a heading word candidate count.

If q≦pmax is satisfied (step S3111: YES), the procedure goes back to step S3107. If q≦pmax is not satisfied (step S3111: NO), the heading number p is incremented and it is determined whether p≦pmax is satisfied (step S3112). If p≦pmax is satisfied (step S3113: YES), the procedure goes back to step S3106. On the other hand, if p≦pmax is not satisfied (step S3113: NO), the procedure goes to step S3008.

FIG. 32A is a flowchart detailing the distance variance calculation process (step S3013). As shown in FIG. 32A, a variable "a" representing an average is set to a=0 (step S3201); a variable "b" representing a variance is set to b=0 (step S3202); and a target element extraction process is executed (step S3203). The target element extraction process (step S3203) is described hereinafter.

Subsequently, j=0 is defined (step S2104), and a candidate number k of the concurrently realized candidate is set to k=tbl(n,j) (step S3205). A word candidate different from other concurrently realized candidates is searched for (step S3206). Subsequently, x=DGX(k)-DHX(k,1) is calculated (step S3207). DGX(k) is an X-coordinate value of the center of the data word candidate of the concurrently realized candidate of the candidate number k, and DHX(k,1) is an X-coordinate value of the center of the first heading word candidate of the concurrently realized candidate of the candidate number k.

Similarly, y=DGy(k)-DHy(k,1) is calculated (step S3208). DGY(k) is a Y-coordinate value of the center of the data word candidate of the concurrently realized candidate of the candidate number k, and DHY(k,1) is a Y-coordinate value of the center of the first heading word candidate of the concurrently realized candidate of the candidate number k. The calculated x and y are used to calculate a distance d between the first heading word candidate and the data word candidate of the concurrently realized candidate of the candidate number k (step S3209).

The calculated distance d is added to the variable a representing an average to update the variable a (step S3210); the square of the distance d is added to the variable b representing a variance to update the variable b (step S3211); and j is incremented (step S3212). It is determined whether j≦tbl_max(n) is satisfied (step S3213).

If j≦tbl_max(n) is satisfied (step S3213: YES), the procedure goes to step S3205. If j≦tbl_max(n) is not satisfied (step S3213: NO), the variable a is stored as an average mean(n) (step S3214), and the variable b is stored as a variance var(n)

(step S3215). This leads to the termination of the distance variance calculation process and the procedure goes to step S3014.

Figure 32B:
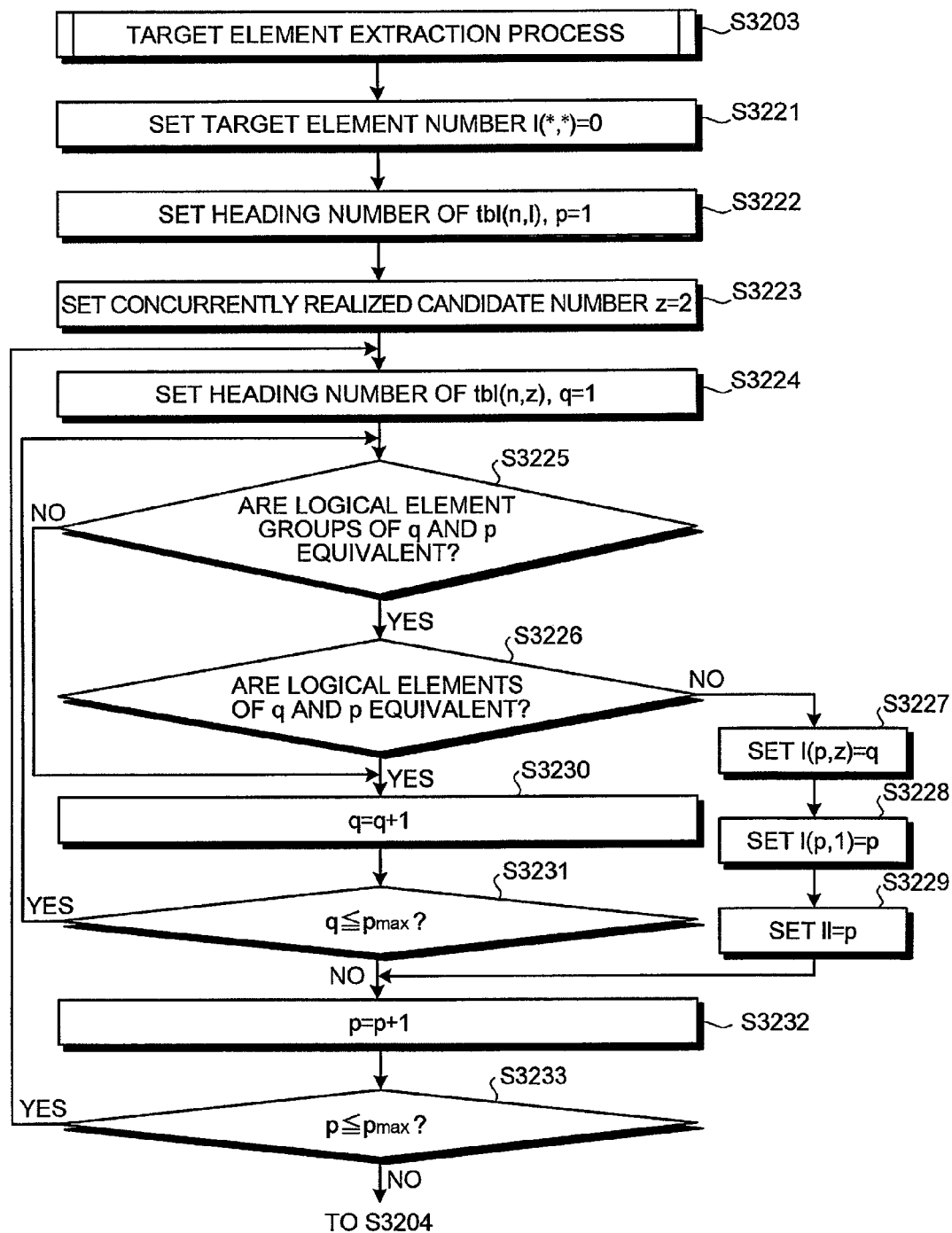
FIG. 32B is a flowchart detailing a target element extraction process (step S3203)

FIG. 32B is a flowchart detailing the target element extraction process (step S3203). As shown in FIG. 32B, a target element number l(*,*) is set to l(*,*)=0 (step S3221); a heading number p of the candidate number table tbl(n,l) is set to p=1 (step S3222); a concurrently realized candidate number z is set to z=2 (step S3223); and a heading number q of the candidate number table tbl(n,z) is set to q=1 (step S3224).

It is determined whether a logical element group of the heading number p is equivalent to a logical element group of the heading number q (step S3225), and if the groups are not equivalent (step S3225: NO), the procedure goes to step S3230. If the groups are equivalent (step S3225: YES), it is determined whether a logical element of the heading number p is equivalent to a logical element of the heading number q (step S3226), and if the elements are not equivalent (step S3226: NO), l(p,z)=q is set (step S3227); l(p,l)=p is set (step S3228); ll=p is set (step S3229); and the procedure goes to step S3232.

On the other hand, if a logical element of the heading number p is equivalent to a logical element of the heading number q at step S3226 (step S3226: YES), the heading number q is incremented (step S3230), and it is determined whether q≦pmax is satisfied (step S3231), where pmax is the number of headings.

If q≦pmax is satisfied (step S3231: YES), the procedure goes back to step S3225. If q≦pmax is not satisfied (step S3231: NO), the heading number p is incremented (step S3232) and it is determined whether p≦pmax is satisfied (step S3233). If p≦pmax is satisfied (step S3233: YES), the procedure goes back to step S3224; if p≦pmax is not satisfied (step S3233: NO), the target element extraction process is terminated.

FIG. 33 is a flowchart detailing the minimum variance selection process (step S3016). As shown in FIG. 33, a minimum variance value min is set to min=0 (step S3301); a minimum variance candidate number minmn=0 is set (step S3301); and the candidate number n of the (N+1)-piece candidate is set to n=1 (step S3303).

It is determined whether a concurrently realized candidate count tbl_max(n) is tbl_max(n)>0 (step S3304). If tbl_max(n)>0 is not satisfied (step S3304: NO), the procedure goes to step S3308. On the other hand, if tbl_max(n)>0 is satisfied (step S3304: YES), it is determined whether the minimum variance value min is min>var(n) (step S3305).

If min>var(n) is not satisfied (step S3305: NO), the procedure goes to step S3308. If min>var(n) is satisfied (step S3305: YES), the minimum variance value min is set to min=var(n) (step S3306), and the minimum variance candidate number min_n is set to min_n=n (step S3307). After incrementing n (step S3308), it is determined whether n≦nmax is satisfied (step S3009), where nmax is a (N+1)-piece set candidate count. If n≦nmax is satisfied (step S3309: YES), the procedure goes back to step S3304. If n≦nmax is not satisfied (step S3309: NO), the procedure goes to step S3017.

FIGS. 34A and 34B are schematics of another evaluation example of combinations of the three-piece set candidates. Although an (N+1)-piece set candidate with a smaller variance is selected as a proper (N+1)-piece set candidate by obtaining a distance between the centers of the heading word candidate and the data word candidate as shown in FIG. 29, the evaluation shown in FIG. 34 is performed by comparing the shapes of circumscribing rectangles including a circumscribing rectangle of the heading word candidate and a circumscribing rectangle of the data word candidate instead of the distance between the centers.

FIG. 34A depicts an evaluation example of a combination of the three-piece set candidates 28B and 28C, and FIG. 34B depicts an evaluation example of a combination of the three-piece set candidates 28D and 28E. Circumscribing rectangles acquired for the three-piece set candidates 28B to 28E are rb, rc, rd, and re, respectively. The areas of the circumscribing rectangles rb and rc are equivalent (a variance between circumscribing rectangles is small) as shown in FIG. 34A, and the areas of the circumscribing rectangles db and de are different (a variance between circumscribing rectangles is large) as shown in FIG. 29B. Therefore, the three-piece set candidates 28B and 28C are selected as the proper three-piece set candidates. When proper three-piece set candidates are actually selected, the three-piece set candidate having a smaller variance between the circumscribing rectangles is selected.

Figure 35:
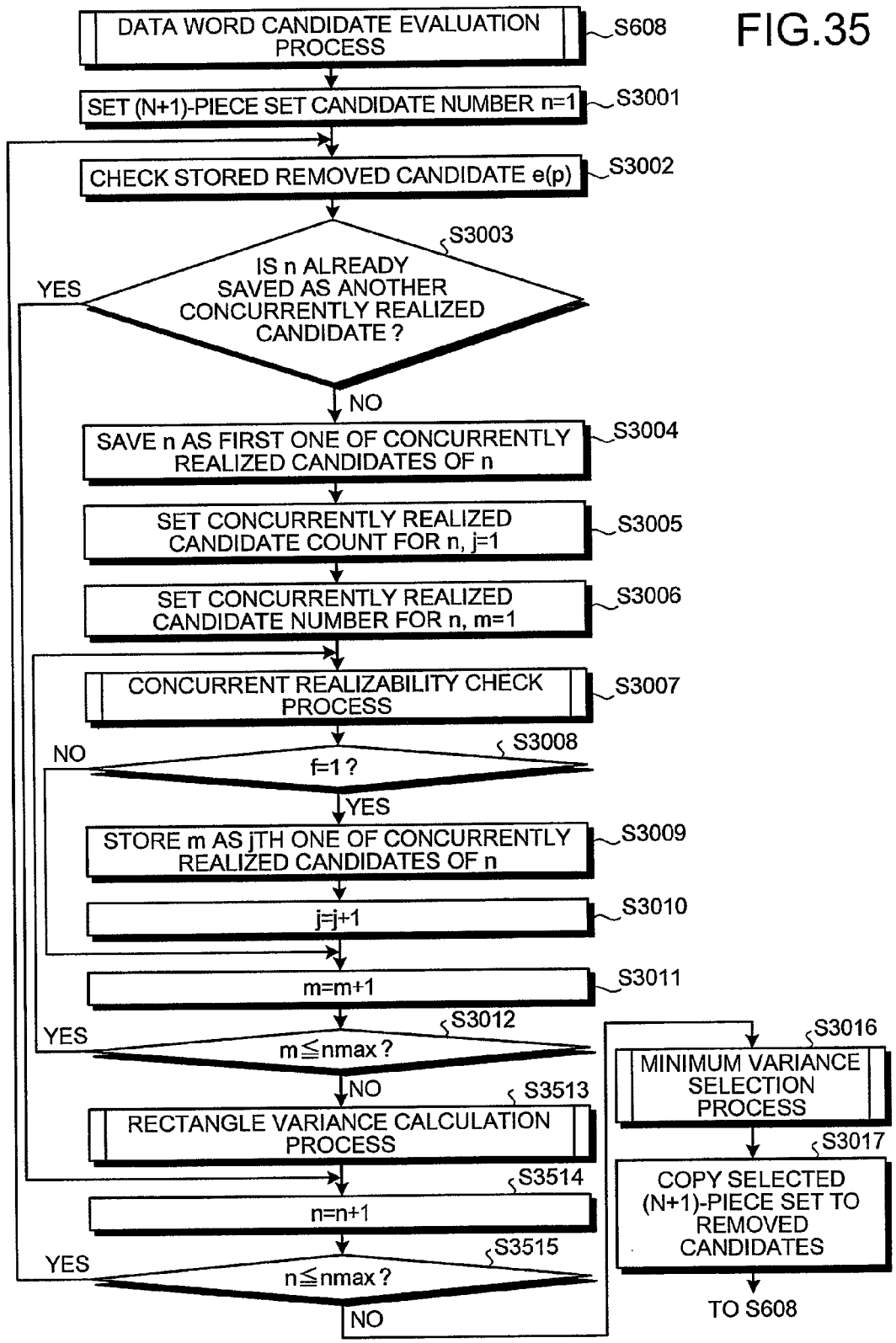
FIG. 35 is a flowchart detailing another procedure of the data word candidate evaluation process (step S608)

FIG. 35 is a flowchart detailing another procedure of the data word candidate evaluation process (step S608). In the flowchart of FIG. 35, step S3013 of the flowchart of FIG. 30 is replaced with step S3513, and other steps are the same as those of FIG. 30. At step S3513, a rectangle variance calculation process is executed.

Figure 36:
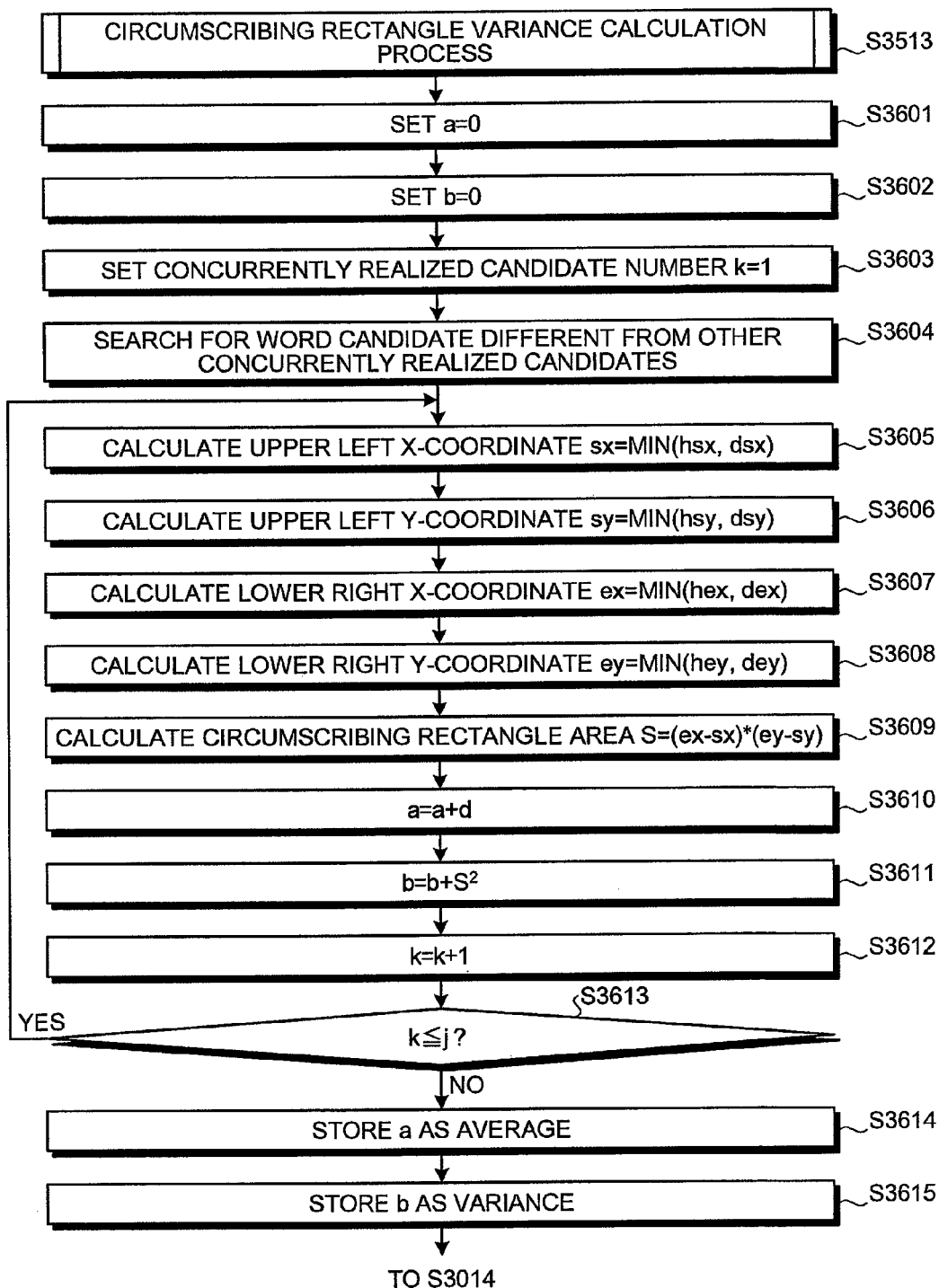
FIG. 36 is a flowchart detailing a rectangle variance calculation process (step S3515) shown in FIG. 35.

FIG. 36 is a flowchart detailing the rectangle variance calculation process (step S3515) shown in FIG. 35. As shown in FIG. 36, a variable "a" representing an average is set to a=0 (step S3601); a variable "b" representing a variance is set to b=0 (step S3602); and a number k of the concurrently realized candidate is set to k=1 (step S3603). A word candidate different from other concurrently realized candidates is searched for (step S3604).

Subsequently, a circumscribing rectangle is calculated that includes the heading word candidate and the data word candidate of the kth concurrently realized candidate. Specifically, an upper left x-coordinate sx=MIN(hsx, dsx) is calculated (step S3605), where hsx denotes an upper left x-coordinate value of the heading word candidate and dsx denotes an upper left x-coordinate value of the data word candidate.

Similarly, an upper left y-coordinate sy=MIN(hsy, dsy) is calculated (step S3606), where hsy denotes an upper left y-coordinate value of the heading word candidate and dsy denotes an upper left y-coordinate value of the data word candidate. A lower right x-coordinate ex=MIN(hex, dex) is calculated (step S3607), where hex denotes a lower right x-coordinate value of the heading word candidate and dex denotes a lower right x-coordinate value of the data word candidate. Similarly, a lower right y-coordinate ey=MIN(hey, dey) is calculated (step S3608), where hey denotes a lower right y-coordinate value of the heading word candidate and dey denotes a lower right y-coordinate value of the data word candidate.

An area S of the circumscribing rectangle (S=(ex−sx)× (ey−sy)) is calculated (step S3609). The calculated area S is added to the variable a representing an average to update the variable a (step S3610); the square of the area S is added to the variable b representing a variance to update the variable b (step S3611); and the number k of the concurrently realized candidate is incremented (step S3612). It is determined whether k≦j is satisfied (step S3613).

If k≦j is satisfied (step S3613: YES), the procedure goes back to step S3605. If k≦j is not satisfied (step S3613: NO), the variable a is stored as an average (step S3614), and the variable b is stored as a variance (step S3615). This leads to the termination of the rectangle variance calculation process and the procedure goes to step S3014.

According to the data word candidate evaluating unit 507, if plural combinations of the heading word candidates and the data word candidates exist, a proper combination can be identified, and higher accuracy can be achieved in the logical structure analysis of a form.

Figure 37:
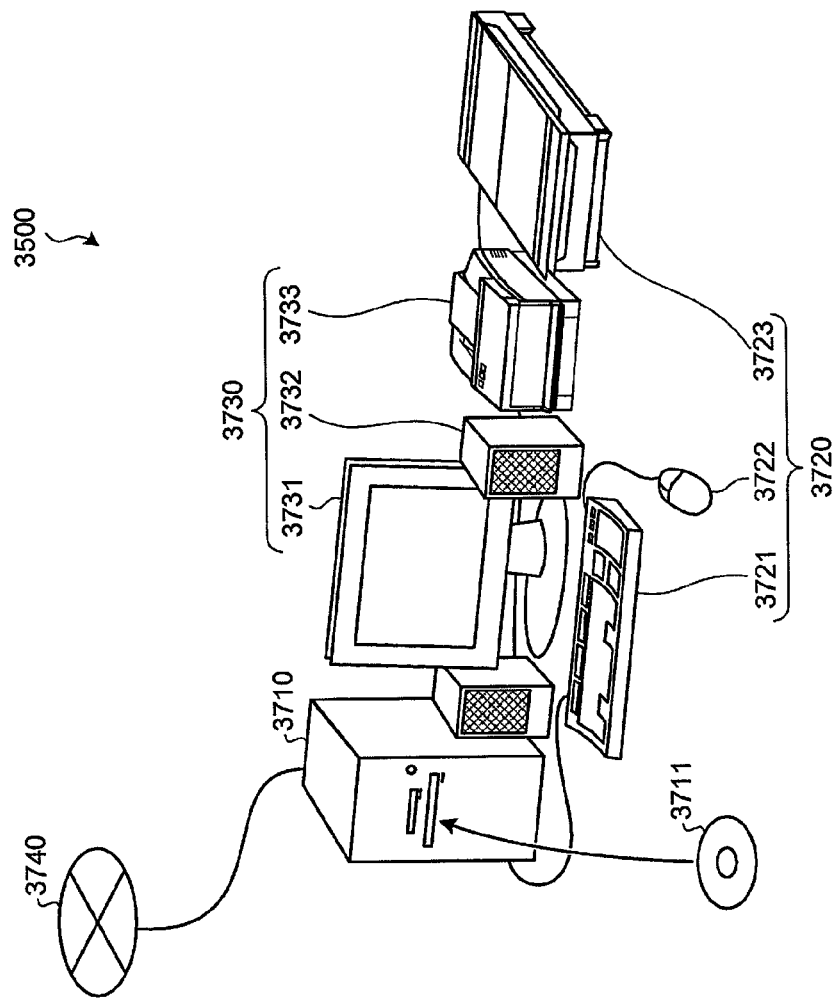
FIG. 37 is a schematic of a hardware configuration of the logical structure analyzing apparatus.

FIG. 37 is a schematic of a hardware configuration of the logical structure analyzing apparatus according to the embodiments. As shown in FIG. 37, the logical structure analyzing apparatus 500 includes a computer 3710, input devices 3720, and output devices 3730, and is connectable to a network 3740 such as LAN and WAN through a router or modem, not shown.

The computer 3710 has a CPU, a memory, and an interface. The CPU is responsible for overall control of the logical structure analyzing apparatus 500. The memory is made up of a ROM, a RAM, an HD, an optical disc 3711, and a flash memory. The memory is used as a work area of the CPU.

The memory has various programs stored therein, which are loaded in accordance with instructions from the CPU. The reading/writing of data to the HD and the optical disc 3711 is controlled by disc drives. The optical disc 3711 and the flash memory are removable from the computer 3710. The interface controls input from the input devices 3720, output to the output devices 3730, and transmission/reception through the network 3740.

The input devices 3720 include a keyboard 3721, a mouse 3722, a scanner 3723, etc. The keyboard 3721 includes keys for entering characters, numeric characters, various instructions, etc., for the input of data. A touch-panel may be used. The mouse 3722 moves a cursor, selects an area, or moves and resizes a window, etc. The scanner 3723 optically reads images. The images read are captured and stored in the memory of the computer 3710 as image data. The scanner 3723 may have an optical character recognition (OCR) function.

The output devices 3730 include a display 3731, a speaker 3732, a printer 3733, etc. The printer 1513 prints image data and document data. The display 3731 displays a cursor, icons or tool boxes as well as data such as documents, images, and function information. The speaker outputs sounds such as sound effects and a reading voice. The printer 3733 prints image data and document data.

The method explained in the present embodiment can be implemented by a computer such as a personal computer and a workstation executing a program that is prepared in advance.

The program is recorded on a non-transitory computer-readable recording medium such as a hard disk, a flexible disk, a CD-ROM, an MO, and a DVD, and is executed by being read out from the recording medium by a computer. The program can be a transmission medium that can be distributed through a network such as the Internet.

According to the embodiment described above, forms with various layouts can be read to uniquely identify plural headings and data identified by the headings, and the logical structures of the forms can be analyzed automatically.

If a determined set candidate includes an ambiguous heading group, an appropriate heading can be identified from relative positions of the data and the ambiguous heading group on the form to uniquely identify the headings and the data identified by the headings.

Similarly, if a determined set candidate includes an ambiguous heading group and an ambiguous data group, an appropriate combination of the data and the heading can be identified from relative positions of the ambiguous data and the ambiguous headings in the determined set candidate to uniquely identify the headings and the data identified by the headings.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A non-transitory computer-readable recording medium that stores therein a logical structure analyzing computer program causing a computer to execute:

extracting word candidates from character strings on a form including one or more headings and one or more data items;

classifying each of the word candidates into a group of heading candidates for the headings or a group of data candidates for the data items to generate, based on positions of the word candidates on the form, first candidate sets each including one of the heading candidates and one of the data candidates identifiable by the heading candidate included;

combining the first candidate sets to generate second candidate sets such that each includes a plurality of the heading candidates that differ and one of the data candidates;

removing, from among the second candidate sets and for each of the data items, a determined set including a data item among the data items and the headings identifying the data item, the removing being based on positions, on the form, of the heading candidates and the data candidate included in each of the second candidate sets; and outputting the determined set.

2. The non-transitory computer-readable recording medium according to claim 1, further comprising evaluating a heading candidate when among the determined sets are a first set including a data item and the headings identifying the data item and a second set where among the headings, a single heading is positioned differently from the headings of the first set, wherein the evaluating includes selecting, as a proper determined set, the first set or the second set based on a position of the single heading and a position of the data item, and the outputting includes outputting the proper determined set.

3. The non-transitory computer-readable recording medium according to claim 2, wherein the evaluating includes selecting the proper determined set based on the position of the single heading on the form relative to the data item.

4. The non-transitory computer-readable recording medium according to claim 2, wherein the evaluating includes selecting the proper determined set based on an area of a region encompassing the data item and the single heading.

5. The non-transitory computer-readable recording medium according to claim 1, further comprising evaluating a data candidate when the determined set includes a plurality of the data items, a first heading identifying the data items and a plurality of second headings equivalent in number to the data items and identified by the data items, wherein the evaluating includes selecting a proper determined set from among combinations of the data items and the second headings by comparing the combinations based on relative positions of the data items and the second headings in the combinations, and the outputting includes outputting the proper determined set.

6. The non-transitory computer-readable recording medium according to claim 5, wherein the evaluating includes selecting the proper determined set by comparing distances between the data items and the second headings in the combinations.

7. The non-transitory computer-readable recording medium according to claim 5, wherein the evaluating includes selecting the proper determined set by comparing areas of regions that encompass the data items and the second headings in the combinations, respectively.

8. A logical structure analyzing apparatus comprising:
an extracting unit that extracts word candidates from character strings on a form including one or more headings and one or more data items;
a first generating unit that classifies each of the word candidates into a group of heading candidates for the headings or a group of data candidates for the data items to generate, based on positions of the word candidates on the form, first candidate sets each including one of the heading candidates and one of the data candidates identifiable by the heading candidate included;
a second generating unit that combines the first candidate sets to generate second candidate sets such that each includes a plurality of the heading candidates that differ and one of the data candidates;
a removing unit that, for each of the data items and based on positions, on the form, of the heading candidates and the data candidate included in each of the second candidate sets, removes from among the second candidate sets, a determined set including a data item among the data items and the headings identifying the data item; and
an output unit that outputs the determined set.

9. A logical structure analyzing method comprising:
extracting unit word candidates from character strings on a form including one or more headings and one or more data items;
classifying each of the word candidates into a group of heading candidates for the headings or a group of data candidates for the data items to generate, based on positions of the word candidates on the form, first candidate sets each including one of the heading candidates and one of the data candidates identifiable by the heading candidate included;
combining the first candidate sets to generate second candidate sets such that each includes a plurality of the heading candidates that differ and one of the data candidates;
removing, from among the second candidate sets and for each of the data items, a determined set including a data item among the data items and the headings identifying the data item, the removing being based on positions, on the form, of the heading candidates and the data candidate included in each of the second candidate sets; and
outputting the determined set.

* * * * *